(12) United States Patent
Tagami et al.

(10) Patent No.: US 12,485,495 B2
(45) Date of Patent: Dec. 2, 2025

(54) WORK MACHINE

(71) Applicant: Koki Holdings Co., Ltd., Tokyo (JP)

(72) Inventors: Hiroyuki Tagami, Ibaraki (JP); Naoto Ichihashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 367 days.

(21) Appl. No.: 18/015,077

(22) PCT Filed: Jul. 9, 2021

(86) PCT No.: PCT/JP2021/025911
§ 371 (c)(1),
(2) Date: Jan. 9, 2023

(87) PCT Pub. No.: WO2022/014479
PCT Pub. Date: Jan. 20, 2022

(65) Prior Publication Data
US 2023/0278119 A1    Sep. 7, 2023

(30) Foreign Application Priority Data

Jul. 15, 2020  (JP) ................................. 2020-121228
Jul. 15, 2020  (JP) ................................. 2020-121229

(51) Int. Cl.
*B23D 59/00* (2006.01)
*B25F 5/02* (2006.01)

(52) U.S. Cl.
CPC .............. *B23D 59/006* (2013.01); *B25F 5/02* (2013.01)

(58) Field of Classification Search
None
See application file for complete search history.

(56) References Cited

U.S. PATENT DOCUMENTS 3,123,111 A * 3/1964 Mattson ............... B23D 59/006
30/390
5,074,044 A * 12/1991 Duncan .............. B23Q 11/0046
30/390
(Continued)

FOREIGN PATENT DOCUMENTS

CN          1751832        3/2006
CN        101505899        8/2009
(Continued)

OTHER PUBLICATIONS

"Office Action of China Counterpart Application", issued on Apr. 26, 2024, with English translation thereof, p. 1-p. 20.
(Continued)

*Primary Examiner* — Tom Rodgers
*Assistant Examiner* — Dana Lee Poon
(74) *Attorney, Agent, or Firm* — JCIPRNET

(57) ABSTRACT

A work machine according to the present invention optimally collects work chips, such as dust, produced during work. In a circular saw 10, a sawdust discharge port 27H and a cover opening 27J are formed in an inner cover 27, and a dust collecting chamber inlet 62L1 and a dust collecting chamber outlet 62L2 are formed in a dust collecting case 60. Furthermore, at least a portion of the dust collecting chamber inlet 62L1 and at least a portion of the dust collecting chamber outlet 62L2 are arranged at the same position in the vertical direction.

15 Claims, 16 Drawing Sheets

(56) References Cited

U.S. PATENT DOCUMENTS

| | | | | |
|---|---|---|---|---|
| 5,675,895 A * | 10/1997 | Mori | ................... | B23Q 11/005 30/390 |
| 7,380,343 B2 * | 6/2008 | Yoshimura | ........... | B23D 59/006 83/100 |
| 2005/0120845 A1 * | 6/2005 | Kamiya | ............... | B23Q 11/127 83/78 |
| 2005/0155232 A1 * | 7/2005 | Bocka | ...................... | B27B 9/02 30/377 |
| 2007/0039189 A1 * | 2/2007 | Roehm | ................ | B23Q 11/005 30/124 |
| 2012/0200140 A1 * | 8/2012 | Nagasawa | ................ | B28D 7/02 299/39.3 |
| 2018/0199794 A1 | 7/2018 | Nemetz et al. | | |
| 2019/0223669 A1 | 7/2019 | Lauer et al. | | |

FOREIGN PATENT DOCUMENTS

| | | |
|---|---|---|
| CN | 202106098 | 1/2012 |
| CN | 108296555 | 7/2018 |
| JP | 2008221455 | 9/2008 |
| JP | 2011068073 | 4/2011 |
| JP | 2014000633 | 1/2014 |
| JP | 2018187704 | 11/2018 |
| JP | 2018187705 | 11/2018 |
| JP | 2019507689 | 3/2019 |

OTHER PUBLICATIONS

"International Search Report (Form PCT/ISA/210) of PCT/JP2021/025911", mailed on Sep. 21, 2021, with English translation thereof, pp. 1-4.

* cited by examiner

WORK MACHINE

CROSS-REFERENCE TO RELATED APPLICATION

This application is a 371 application of the International PCT application serial no. PCT/JP2021/025911, filed on Jul. 9, 2021, which claims the priority benefits of Japan Patent Application No. 2020-121228, filed on Jul. 15, 2020, and Japan Patent Application No. 2020-121229, filed on Jul. 15, 2020. The entirety of each of the above-mentioned patent applications is hereby incorporated by reference herein and made a part of this specification.

TECHNICAL FIELD

The present invention relates to a work machine.

BACKGROUND ART

A portable circular saw (work machine) described in Patent Literature 1 below has a dust box (dust collecting box), and sawdust produced during work is collected in the dust box. Specifically, the dust box has an opening, and sawdust picked up by the rotation of the circular saw flows into the dust box through the opening. As a result, sawdust can be collected in the dust box during cutting.

CITATION LIST

Patent Literature

[Patent Literature 1]
Japanese Patent Laid-Open No. JP 2011-68073

SUMMARY OF INVENTION

Technical Problem

However, the portable circular saw has room for improvement in the following points. That is, in the portable circular saw, an air flow is generated by the rotational force of the circular saw when cutting a workpiece, and the sawdust flows into the dust box together with the air.

Here, in the portable circular saw, air continuously flows into the dust box during cutting, which may increase the pressure in the dust box and reduce the dust collection efficiency of the dust box.

In consideration of the above facts, an objective of the present invention is to provide a work machine that can optimally collect work chips, such as dust, produced during work.

Solution to Problem

According to one or more embodiments of the present invention, there is provided a work machine including: a base formed in a plate shape; a housing supported by the base on one side in a plate thickness direction of the base, accommodating a motor for driving a tip tool, and including a cover member that covers the tip tool; and a dust collecting case fixed to the housing and having a dust collecting chamber capable of collecting work chips produced by driving the tip tool, in which the cover member is provided with a first opening for delivering the work chips to the dust collecting chamber and a second opening for delivering air in the dust collecting chamber to the inside of the cover member, the dust collecting case is provided with an inlet for delivering the work chips delivered from the first opening to the dust collecting chamber, an inflow part connecting the inlet and the first opening, an outlet for delivering air in the dust collecting chamber to the second opening, an outflow part connecting the outlet and the second opening, and a division part that partitions the dust collecting chamber, the inflow part, and the outflow part, and at least a part of the inlet and at least a part of the outlet are arranged at the same position in the plate thickness direction of the base.

In the work machine according to one or more embodiments of the present invention, the base is formed with a through-hole for making a part of the tip tool protrude to the other side in the plate thickness direction of the base, the housing is connected to an adjustment mechanism capable of adjusting a protrusion amount of the tip tool from the through-hole, and at least a part of the inlet and at least a part of the outlet are arranged at the same position in the plate thickness direction of the base at least when the protrusion amount of the tip tool is the maximum.

In the work machine according to one or more embodiments of the present invention, the tip tool is a disk-shaped circular saw blade, and the cover member covers the circular saw blade from one side in the plate thickness direction of the base.

In the work machine according to one or more embodiments of the present invention, the inlet and the outlet are arranged side by side in the plate thickness direction of the circular saw blade.

In the work machine according to one or more embodiments of the present invention, the first opening is arranged upstream of the second opening in a rotational direction of the circular saw blade.

In the work machine according to one or more embodiments of the present invention, the second opening is composed of a plurality of holes.

In the work machine according to one or more embodiments of the present invention, an area of the inlet is 80% to 120% of an area of the outlet.

In the work machine according to one or more embodiments of the present invention, the dust collecting case is provided with a partition wall that partitions the inflow part and the outflow part.

In the work machine according to one or more embodiments of the present invention, the dust collecting case is provided with a guide part that partitions the inflow part and the outflow part in a direction different from the partition wall.

In the work machine according to one or more embodiments of the present invention, sawdust or air discharged from the inlet to the dust collecting chamber is guided by the guide part in a direction away from the outlet. In the work machine according to one or more embodiments of the present invention, a flow passage area of the inflow part decreases toward the inlet due to the guide part. In the work machine according to one or more embodiments of the present invention, the dust collecting chamber has a case top wall, a case bottom wall, and a case side wall connecting the case top wall and the case bottom wall, and at least one of the inlet and the outlet is adjacent to the case top wall.

According to one or more embodiments of the present invention, there is provided a work machine that performs processing work in a forward direction, the work machine having a dust collection structure that collects dust produced by the processing work, in which the dust collection structure includes a dust collecting chamber for storing dust, a transfer part having an inflow part that delivers dust to the storage part and an outflow part that discharges air in the dust collecting chamber to the outside of the dust collection structure, respectively, a first partition part connected to a lower part of the dust collecting chamber and extending upward to partition the dust collecting chamber and the transfer part, and a communication part positioned above an upper end of the first partition part and communicating between the dust collecting chamber and the transfer part, in which the communication part is provided with an inlet connected to the inflow part and an outlet connected to the outflow part, and is configured such that positions of one end of the inlet and one end of the outlet in the left-and-right direction are different from each other. In the work machine according to one or more embodiments of the present invention, at least a part of the inlet and at least a part of the outlet are configured to be arranged at different positions in the left-and-right direction or at the same position in the up-and-down direction. In the work machine according to one or more embodiments of the present invention, the transfer part is provided with a second partition part that partitions the inflow part and the outflow part in the front-and-rear direction, and a third partition part that partitions the inflow part and the outflow part in the left-and-right direction.

According to one or more embodiments of the present invention, there is provided a work machine, including: a base formed in a plate shape; a housing supported by the base on one side in a plate thickness direction of the base, accommodating a motor for driving a tip tool, and including a cover member that covers the tip tool; a first opening and a second opening that are formed in the cover member and configured to allow passage of work chips produced when the tip tool is driven; and a dust collector provided in the cover member for collecting the work chips, in which the dust collector includes a first discharge passage that is connected to the first opening, forms a first dust collecting passage that allows communication between the inside of the cover member and outside of the dust collector with the first opening, and discharges the work chips that have passed through the first opening to the outside, and a second discharge passage that is connected to the second opening and the first discharge passage, forms a second dust collecting passage that allows communication between the inside of the cover member and the outside of the first discharge passage with the second opening, and discharges the work chips that have passed through the second opening to the first discharge passage, and the smallest flow passage area of the second dust collecting passage is set to be equal to or less than the smallest flow passage area of the first dust collecting passage.

Advantageous Effects of Invention

According to one or more embodiments of the present invention, work chips, such as dust, produced during work can be optimally collected.

DESCRIPTION OF EMBODIMENTS

Figure 1:
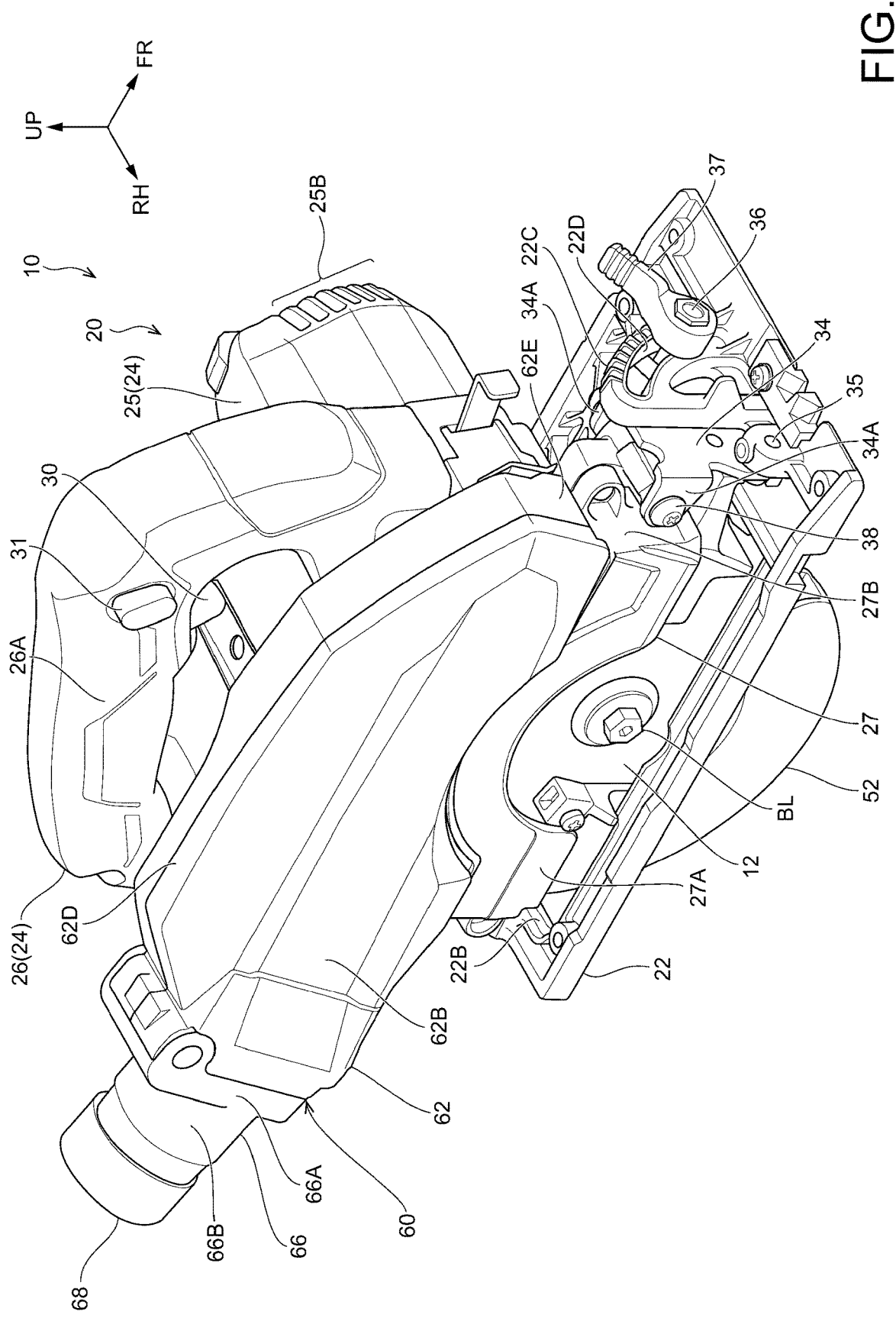
FIG. 1 is a perspective view when a circular saw according to an embodiment is viewed obliquely from the front right.

A circular saw 10 as a work machine according to the present embodiment will be described below with reference to the drawings. An arrow UP, an arrow FR, and an arrow RH appropriately shown in the drawings indicate the upper side, the front side, and the right side of the circular saw 10, respectively. In the following description, when the up/down, front/rear, and left/right directions are used, the up-and-down, front-and-rear, and left-and-right directions of the circular saw 10 are indicated unless otherwise specified.

Figure 2:
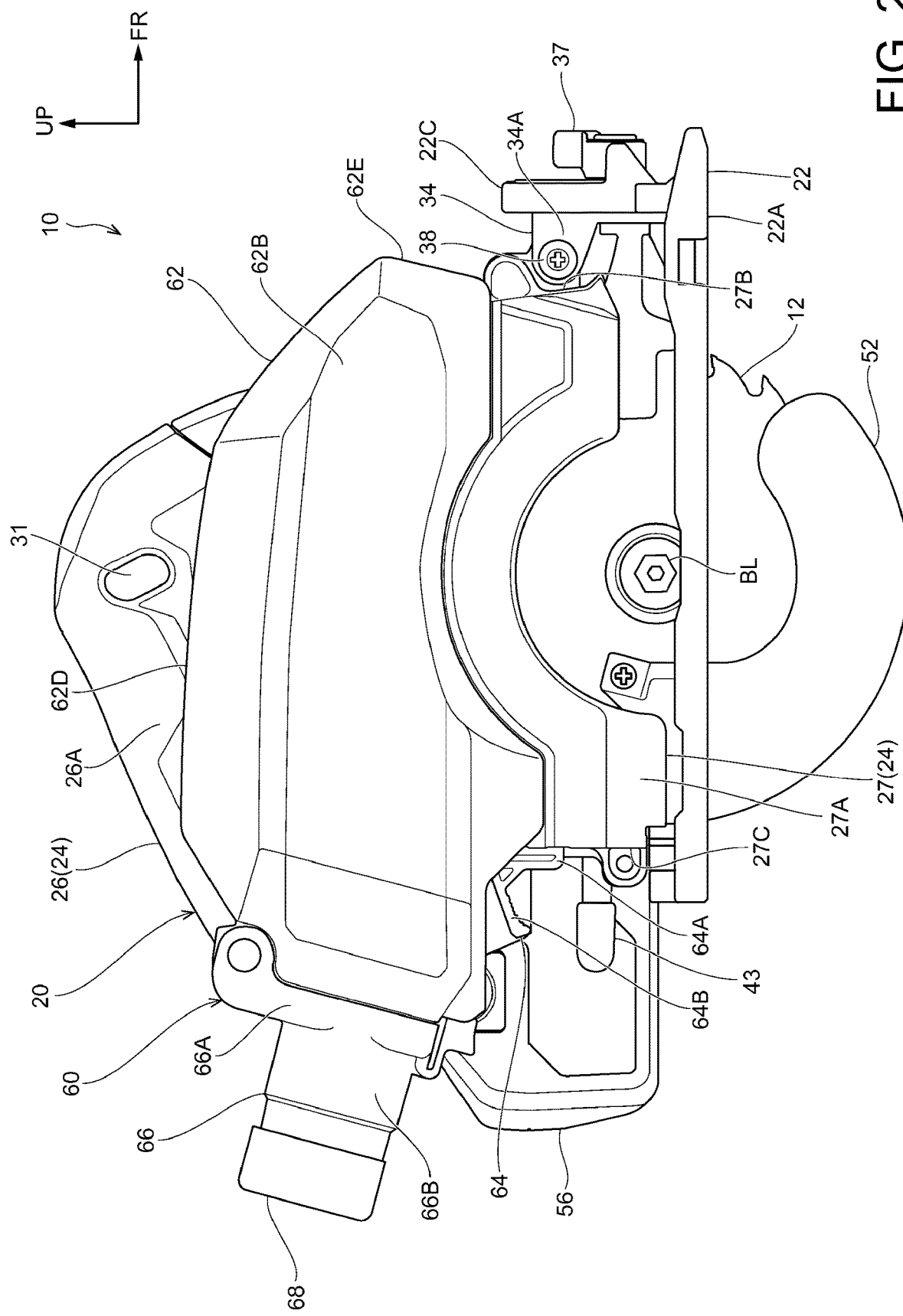
FIG. 2 is a side view when the circular saw shown in FIG. 1 is viewed from the right side.
Figure 15:
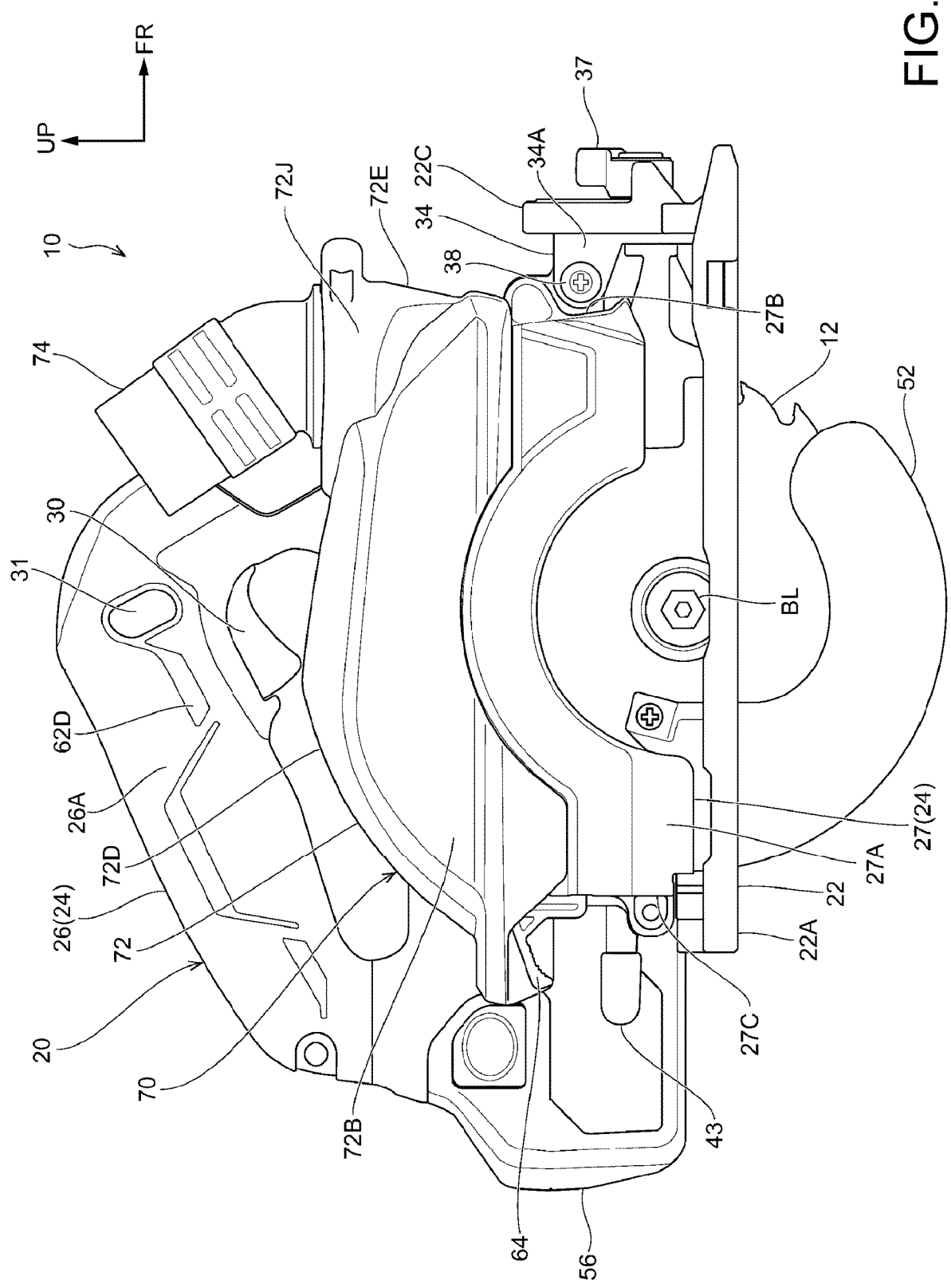
FIG. 15 is a side view when a state where a dust collecting adapter is mounted on the tool body instead of the dust collecting case shown in FIG. 2 is viewed from the right side.

The circular saw 10 is configured as a tool for cutting a workpiece. As shown in FIGS. 1 to 4, the circular saw 10 has a tool body 20 for cutting a workpiece. Further, as shown in FIGS. 2 and 15, the circular saw 10 has a dust collecting case 60 or a dust collecting adapter 70 as a dust collector for collecting sawdust as work chips produced during cutting. The dust collecting case 60 and the dust collecting adapter 70 are configured to be attachable to and detachable from the tool body 20, and the dust collecting case 60 or the dust collecting adapter 70 can be selectively mounted on the tool body 20 by an operator according to the dust collection mode for sawdust. Specifically, in a case of collecting sawdust without using a dust collecting device (dust collecting machine, cleaner) driven by a power source (not shown), the dust collecting case 60 is mounted on the tool body 20, and in a case of collecting sawdust using the dust collecting device, the dust collecting adapter 70 is mounted on the tool body 20. Hereinafter, the configuration of the tool body 20 will be described first, and then the configurations of the dust collecting case 60 and the dust collecting adapter 70 will be described.

(Regarding Tool Body 20)

As shown in FIGS. 1 to 7, the tool body 20 includes a base 22, a housing 24, a drive mechanism 46 and a control part 54 accommodated in the housing 24, and a battery pack 56. The tool body 20 also has an adjustment mechanism 33 for connecting the housing 24 to the base 22.

(Regarding Base 22)

The base 22 is formed in the shape of a substantially rectangular plate of which the up-and-down direction is the plate thickness direction and the front-and-rear direction is the longitudinal direction. The lower surface of the base 22 is configured as a sliding surface 22A, and when the circular saw 10 is used for cutting, the base 22 is placed on the upper side of the workpiece, and the sliding surface 22A slides along the upper surface of the workpiece.

On the base 22, a tool insertion part 22B is formed in a penetrating manner as a through-hole for arranging the circular saw blade 12 as a tip tool. The tool insertion part 22B is formed in a substantially elongated hole shape of which the front-and-rear direction is the longitudinal direction. Here, the circular saw blade 12 is formed in a substantially disk shape of which the left-and-right direction is the plate thickness direction, and the center part of the circular saw blade 12 is fixed to be rotatable integrally with an output shaft 50 of the drive mechanism 46 (which will be described later). The circular saw blade 12 is arranged in the tool insertion part 22B, the upper part of the circular saw blade 12 protrudes upward (one side in the plate thickness direction of the base 22) from the base 22, and the lower end part of the circular saw blade 12 protrudes downward (the other side in the plate thickness direction of the base 22) from the base 22. When cutting a workpiece, the circular saw blade 12 rotates to one side (direction of arrow A in FIG. 7) around the output shaft 50 in a right view.

A fixing wall 22C (refer to FIGS. 1 and 4) for fixing a fixing shaft 36 of the adjustment mechanism 33 (which will be described later) is formed at the front end part of the base 22, and the fixing wall 22C protrudes upward from the base 22 with the front-and-rear direction as the plate thickness direction. A fixing groove 22D (refer to FIGS. 1 and 4) is formed in a penetrating manner on the fixing wall 22C, and the fixing groove 22D curves in a substantially arc shape projecting obliquely upward to the left in a front view.

(Regarding Housing 24)

The housing 24 forms the outline of the tool body 20 and is arranged above the base 22. The housing 24 includes a body housing 25 that accommodates a drive mechanism 46 (which will be described later), a handle housing 26 that forms the upper part of the housing 24, and an inner cover 27.

The body housing 25 is composed of a plurality of housing members, and is formed in a substantially bottomed cylindrical shape that is open to the right as a whole. At a right end part of the body housing 25, a saw cover part 25A (refer to FIGS. 4 to 6) projecting radially outward is formed. The saw cover part 25A is formed in a substantially semicircular shape projecting upward in a right view. The saw cover part 25A, together with the inner cover 27 (which will be described later), is configured as a member that covers the upper part of the circular saw blade 12, and the saw cover part 25A and the inner cover 27 correspond to the cover member of the present invention. The saw cover part 25A and the inner cover 27 are connected to the base 22 at the front end part and the rear end part by the adjustment mechanism 33 (which will be described later).

At the left end part of the body housing 25, a plurality of intake ports 25B is formed in a penetrating manner at the front and rear corner parts. The plurality of intake ports 25B is formed from the bottom wall (left end part) to the front and rear side walls of the body housing 25, and are arranged side by side at predetermined intervals in the up-and-down direction.

The handle housing 26 is formed in a substantially hollow D shape in a left view, is arranged to cover the body housing 25 from the upper side and the rear side, and is connected to the body housing 25. An upper end part of the handle housing 26 is configured as a handle part 26A that is gripped by an operator, and the handle part 26A is inclined downward toward the rear side in a side view.

A trigger 30 is provided at the front end part of the handle part 26A. The trigger 30 protrudes downward from the handle part 26A and can be pulled upward. A lock button 31 for locking the pulling of the trigger 30 is provided on the upper side of the trigger 30 in the handle part 26A. Furthermore, a switch mechanism (not shown) is provided inside the handle part 26A. The switch mechanism has a switch (not shown) operated by the trigger 30. The switch is electrically connected to a control part 54 (which will be described later), and is configured to output an output signal to the control part 54 according to the operating state of the trigger 30.

A rear lower end part of the handle housing 26 is configured as a battery mounting part 26B for mounting the battery pack 56 (which will be described later). The battery mounting part 26B is provided with a connector (not shown), and the connector is electrically connected to a control part 54 (which will be described later).

The inner cover 27 is arranged adjacently to the right side of the saw cover part 25A of the body housing 25, and is configured as a member that covers the circular saw blade 12 from above and from the right side. Specifically, the inner cover 27 includes a substantially semicircular cover side wall 27A projecting upward with the left-and-right direction as the plate thickness direction, a cover front wall 27B extending leftward from the front end part of the cover side wall 27A, a cover rear wall 27C extending leftward from the rear end part of the cover side wall 27A, and a cover top wall 27D extending leftward from the upper outer peripheral part of the cover side wall 27A. The cover top wall 27D is curved in an arc shape projecting upward in a right view, corresponding to the outer peripheral part of the circular saw blade 12, and the front end part of the cover top wall 27D extends in the front-and-rear direction in a side view. On the left side of the front end part of the inner cover 27, there is provided a cover left wall 27P that forms the left wall of a sawdust discharge part 27E (which will be described later).

The inner cover 27 is arranged adjacent to the right side of the saw cover part 25A of the body housing 25, the cover front wall 27B is fastened and fixed to the front end part of the saw cover part 25A, and the cover rear wall 27C is fastened and fixed to the rear end part of the saw cover part 25A. As a result, inside the inner cover 27 and the saw cover part 25A, a downwardly open tool accommodating space 28 (refer to FIGS. 5 and 7) is formed, and the upper part of the circular saw blade 12 is accommodated in the tool accommodating space 28.

Figure 13:
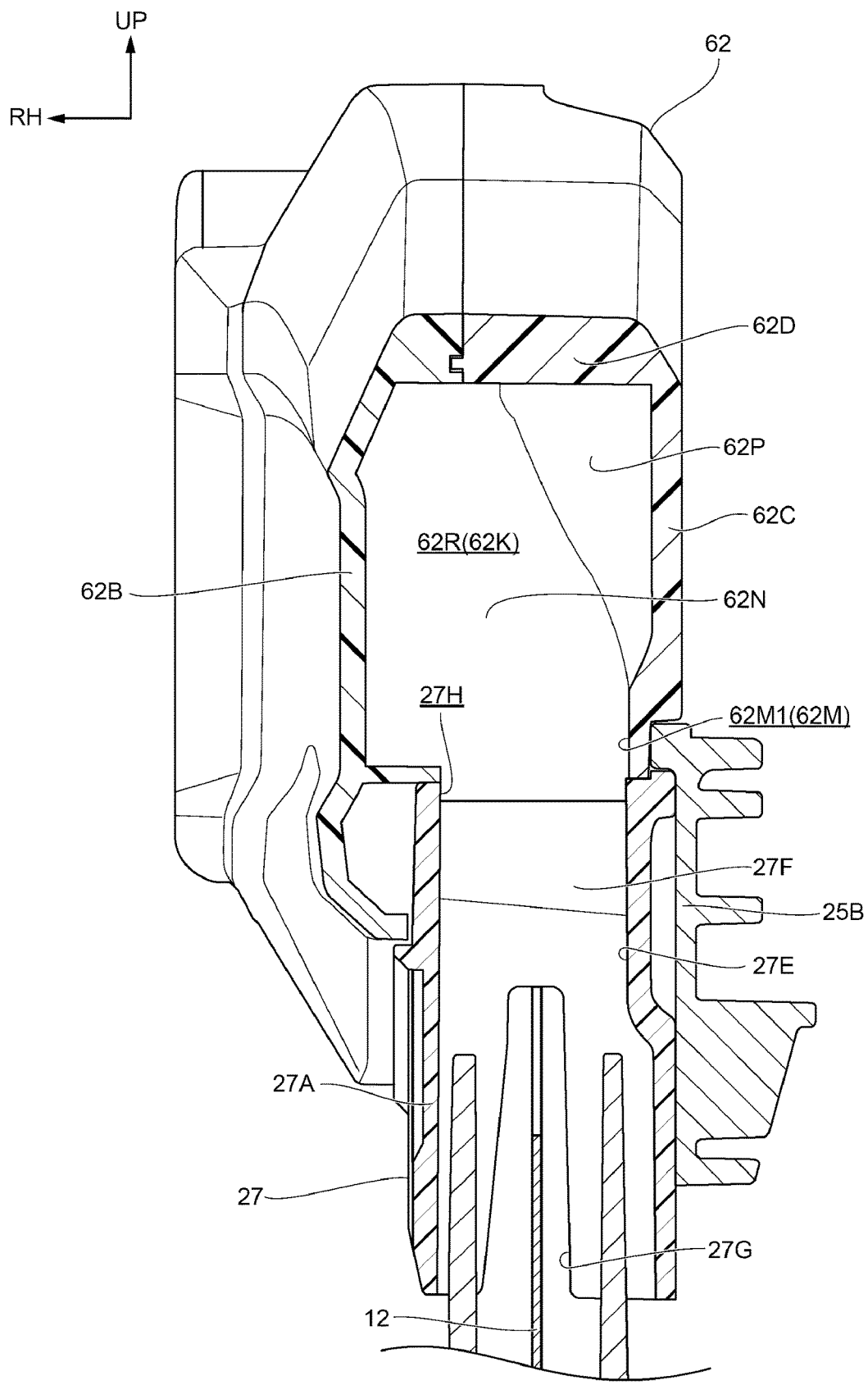
FIG. 13 is a sectional view (sectional view taken along line 13-13 in FIG. 8) when a front part of the dust collecting case shown in FIG. 8 is viewed from the front side.

The front end part of the inner cover 27 is formed with a substantially rectangular cylindrical sawdust discharge part 27E of which the up-and-down direction is the axial direction. The sawdust discharge part 27E is arranged on the front side of the center part of the circular saw blade 12 in a side view. More specifically, the front end part of the circular saw blade 12 is arranged below the sawdust discharge part 27E. The front wall of the sawdust discharge part 27E is composed of the cover front wall 27B, the right wall of the sawdust discharge part 27E is composed of the cover side wall 27A, and the left wall of the sawdust discharge part 27E is composed of the cover left wall 27P. A rear wall of the sawdust discharge part 27E is configured as a division wall 27F as a division part. A downwardly open division slit 27G (refer to FIG. 13) is formed at the lower part of the division wall 27F, and the outer peripheral part of the front end side of the circular saw blade 12 is arranged in the division slit 27G. In this manner, the sawdust discharge part 27E is formed in a tubular shape by the cover front wall 27B, the cover side wall 27A, the cover left wall 27P, and the division wall 27F. Further, the upper end part of the sawdust discharge part 27E has a shape that protrudes upward from the arc-shaped cover top wall 27D. Further, the upper opening of the sawdust discharge part 27E is configured as a sawdust discharge port 27H as a first opening. As a result, when cutting the workpiece, sawdust picked up by the circular saw blade 12 is introduced into the sawdust discharge part 27E and discharged upward from the sawdust discharge port 27H. In this manner, the lower end of the sawdust discharge part 27E serves as an entrance for the picked-up sawdust. In addition, in the sawdust discharge part 27E, the division wall 27F and the cover front wall 27B are inclined in a direction of being spaced apart from each other toward the lower side in a side view, and are set such that the opening area at the part of the sawdust discharge port 27H is the smallest.

On the cover top wall 27D, a cover opening 27J as a second opening is formed in a penetrating manner on the rear side of the sawdust discharge port 27H and on the front side of the center part of the circular saw blade 12. That is, the cover opening 27J is arranged on the downstream side in the rotational direction of the circular saw blade 12 with respect to the sawdust discharge port 27H. The cover opening 27J is composed of opening hole parts 27J1 as a plurality of (four in the present embodiment) holes. The opening hole parts 27J1 are formed in an elongated shape of which the left-and-right direction is the longitudinal direction, and are arranged side by side in the front-and-rear direction (the rotational direction of the circular saw blade 12). The opening areas of each of the opening hole parts 27J1 that form the sawdust discharge port 27H and the cover opening 27J are set to areas through which sawdust produced during cutting can pass. Also, the opening area of the cover opening 27J (total area of the plurality of opening hole parts 27J1) is set to be smaller than the opening area of the sawdust discharge port 27H.

In addition, the division wall 27F described above is arranged between the sawdust discharge port 27H and the cover opening 27J, and the upper part of the tool accommodating space 28 is divided in a front-and-rear direction by the division wall 27F below the sawdust discharge port 27H and the cover opening 27J.

On the cover top wall 27D, a first rib 27K (refer to FIG. 4) is formed behind the cover opening 27J, and the first rib 27K extends in the front-and-rear direction with the left-and-right direction as the plate thickness direction. Further, on the cover top wall 27D, a second rib 27L (refer to FIG. 4) is formed behind the first rib 27K. Similar to the first rib 27K, the second rib 27L extends in the front-and-rear direction with the left-and-right direction as the plate thickness direction.

At the upper end part of the cover front wall 27B, a cover projection 27M for attaching the dust collecting case 60 or the dust collecting adapter 70 (which will be described later) (in a broad sense, an element grasped as an attachment part, refer to FIGS. 4 and 7) is formed. The cover projection 27M protrudes forward from the cover front wall 27B and extends in the left-and-right direction. On the other hand, on the cover rear wall 27C, an attachment groove part 27N for attaching the dust collecting case 60 or the dust collecting adapter 70 (which will be described later) (in a broad sense, an element grasped as an attachment part, refer to FIG. 7) is formed. The attachment groove part 27N is opened rearward and extends in the left-and-right direction. The inner cover 27 is a part of the dust collection structure in the present invention.

(Regarding Adjustment Mechanism 33)

Figure 4:
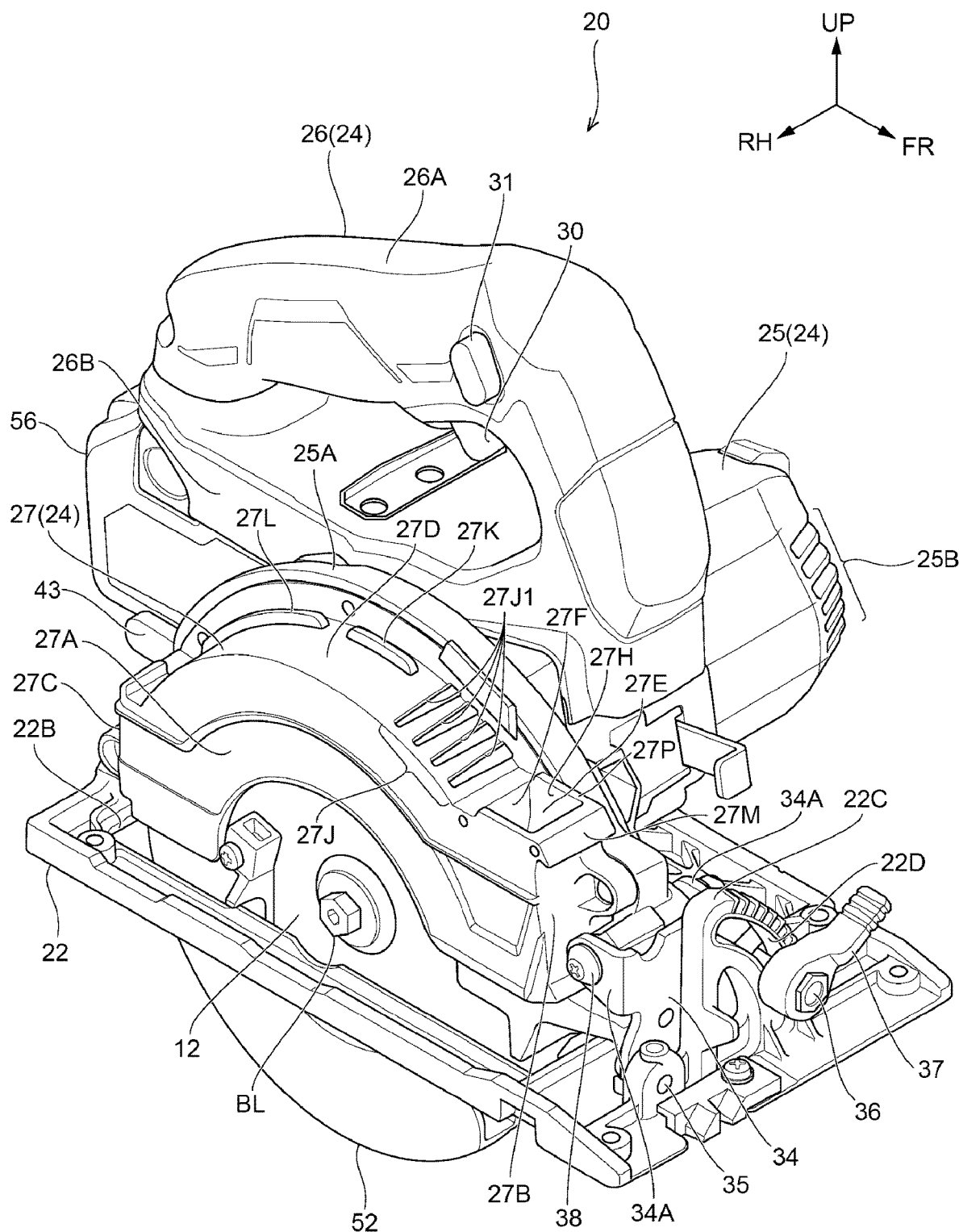
FIG. 4 is a perspective view when a tool body of the circular saw shown in FIG. 1 is viewed obliquely from the front right.
Figure 5:
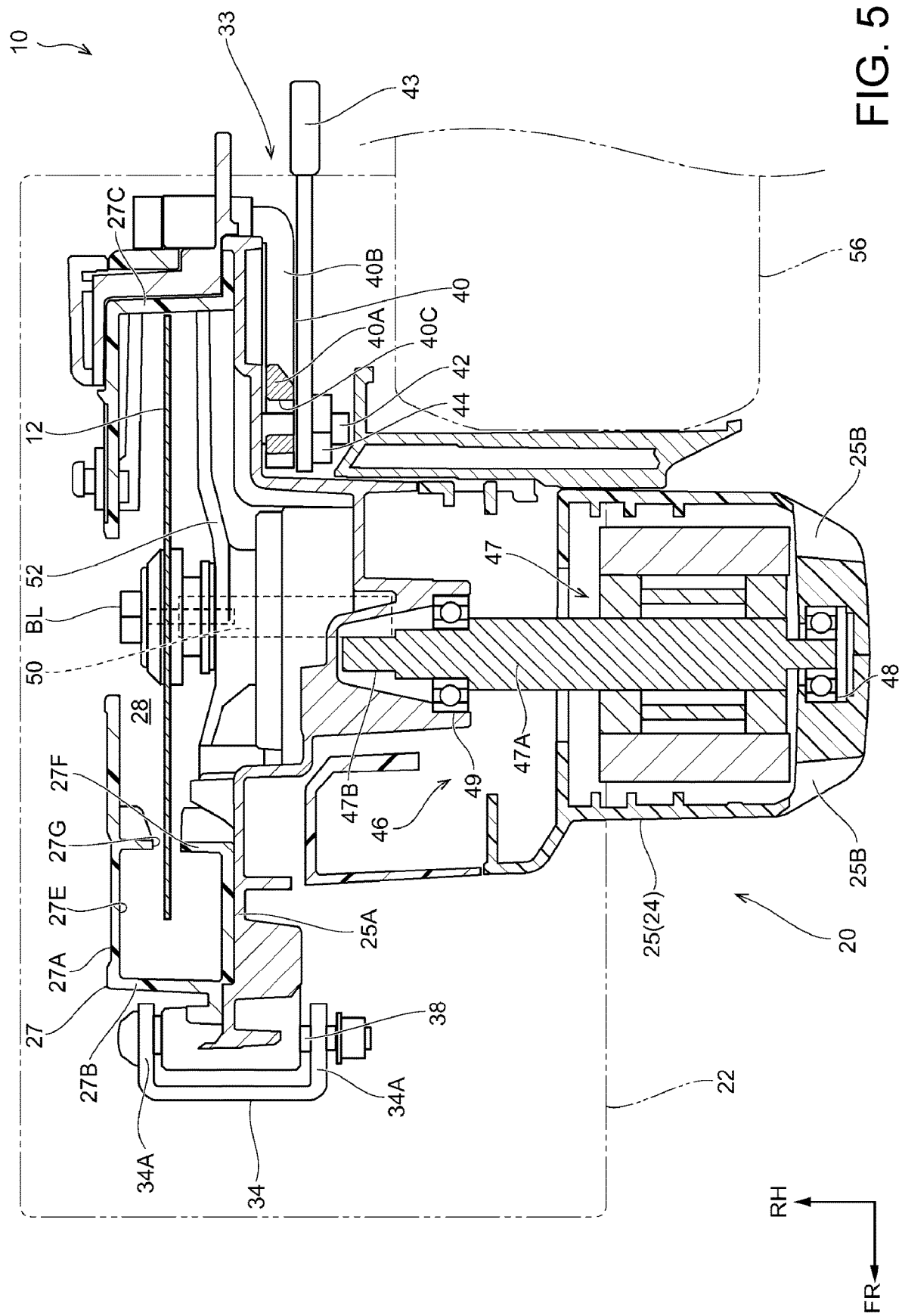
FIG. 5 is a sectional view (sectional view taken along line 5-5 in FIG. 3) when the inside of the tool body shown in FIG. 3 is viewed from above.
Figure 6:
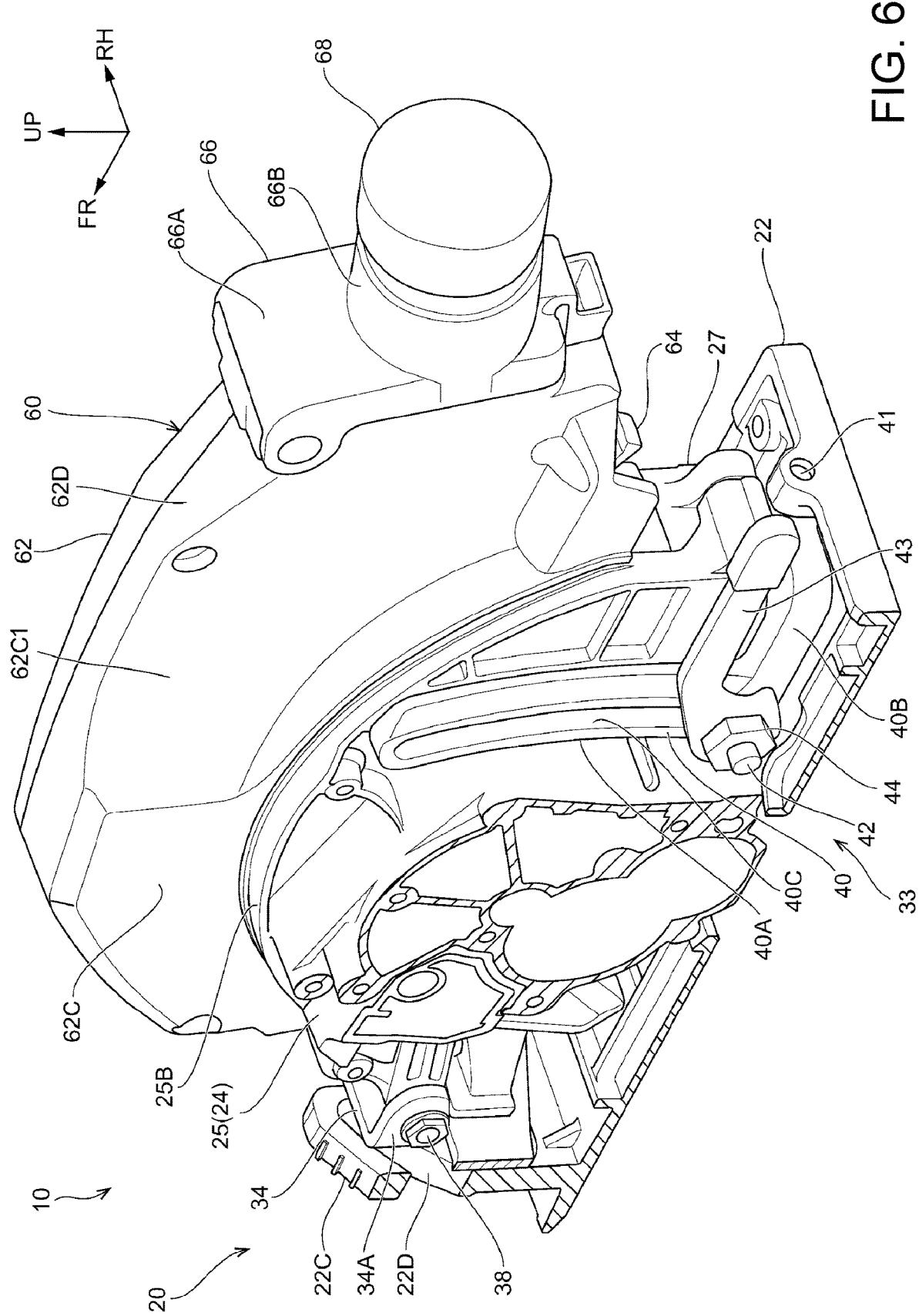
FIG. 6 is a partially cut perspective view when an adjustment mechanism shown in FIG. 5 is viewed obliquely from the rear left.

As shown in FIGS. 4 to 6, the adjustment mechanism 33 is configured as a mechanism for connecting the housing 24 to the base 22 and includes a protrusion amount adjustment mechanism that adjusts the protrusion amount of the circular saw blade 12 downward from the base 22, and an inclination adjusting mechanism that adjusts the angle of the circular saw blade 12 protruding downward from the base 22 with respect to the base 22. The adjustment mechanism 33 includes a connection plate 34, a link 40 and a fixing lever 43.

The connection plate 34 is arranged between the saw cover part 25A and the inner cover 27 and the fixing wall 22C of the base 22 with the front-and-rear direction as the plate thickness direction. A lower end part of the connection plate 34 is rotatably supported by a front connecting shaft 35 of which the front-and-rear direction is the axial direction, and the front connecting shaft 35 is fixed to the base 22. The front connecting shaft 35 is arranged at a position on the right side of the fixing wall 22C and at the center of the fixing groove 22D, and the fixing groove 22D extends in the peripheral direction of the front connecting shaft 35 in a front view. A fixing shaft 36 is provided on the connection plate 34. The fixing shaft 36 protrudes forward from the connection plate 34 with the front-and-rear direction as the axial direction, is inserted into the fixing groove 22D of the base 22 to be relatively movable, and is arranged at the lower end part of the fixing groove 22D. A fixing arm 37 is screwed onto the front end part of the fixing shaft 36, and the fixing shaft 36 is fixed to the fixing wall 22C by the fixing arm 37.

At the upper end part of the connection plate 34, a pair of left and right support pieces 34A that are bent rearward are formed, and the support pieces 34A are arranged with the left-and-right direction as the plate thickness direction. Between the pair of support pieces 34A, a support shaft 38 of which the left-and-right direction is the axial direction is bridged. Front end parts of the saw cover part 25A and the inner cover 27 are rotatably supported by the support shaft 38. Accordingly, the front end part of the housing 24 is connected to the base 22 by the support shaft 38, the connection plate 34, and the fixing shaft 36. Further, (the front end part of) the housing 24 is configured to be rotatable around the front connecting shaft 35 and rotatable around the support shaft 38. When the housing 24 rotates around the front connecting shaft 35, the circular saw blade 12 can be inclined with respect to the base 22.

The link 40 is arranged on the left side of the rear part of the saw cover part 25A. The link 40 includes a link body part 40A extending in the up-and-down direction, and a link connection part 40B extending rearward from the lower end part of the link body part 40A. The link connection part 40B is formed in a substantially L shape in a plan view. That is, the rear end part of the link connection part 40B is bent rightward and arranged behind the saw cover part 25A and the inner cover 27. The tip end part of the link connection part 40B is rotatably supported by a rear connecting shaft 41 (refer to FIG. 6) of which the front-and-rear direction is the axial direction, and the rear connecting shaft 41 is fixed to the base 22 and is arranged coaxially with the front connecting shaft 35.

The link body part 40A is curved in an arc shape projecting substantially rearward in a side view. Specifically, the link body part 40A is curved in a substantially arc shape centering on the support shaft 38 in a side view. A link groove 40C is formed in the link body part 40A, and the link groove 40C extends along the longitudinal direction of the link body part 40A and penetrates in the left-and-right direction. A link shaft 42 of which the left-and-right direction is the axial direction is inserted into the link groove 40C to be relatively movable, and the right end part of the link shaft 42 is fixed to the saw cover part 25A. As a result, the link shaft 42 relatively moves in the link groove 40C, and accordingly, the housing 24 is configured to rotate around the support shaft 38. That is, the posture of the circular saw 10 is changed, and the downward protrusion amount of the circular saw blade 12 with respect to the base 22 can be adjusted.

Figure 7:
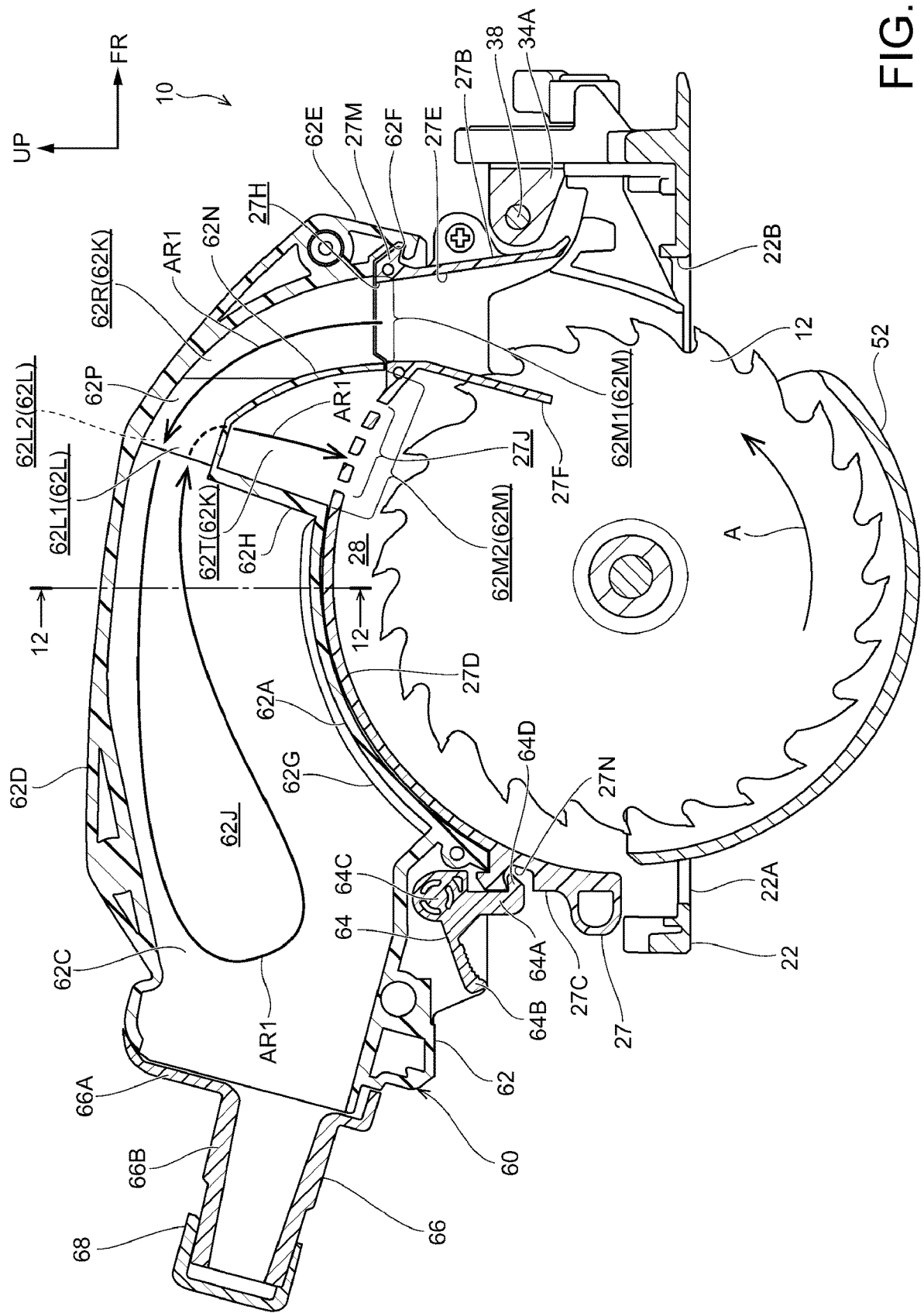
FIG. 7 is a sectional view when the inside of a dust collecting case in an initial state of the circular saw shown in FIG. 2 is viewed from the right side.
Figure 8:
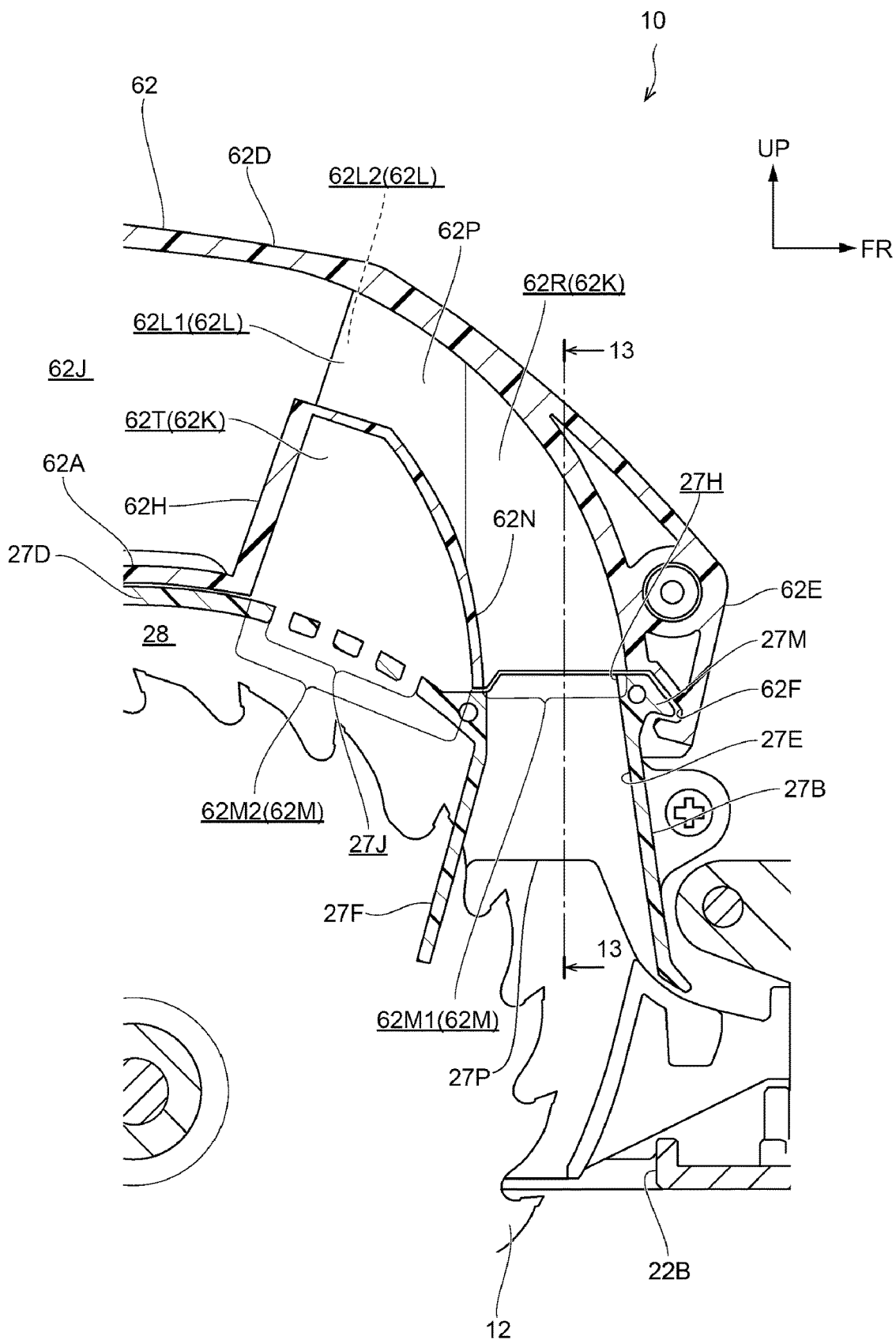
FIG. 8 is a sectional view showing an enlarged front part of the dust collecting case shown in FIG. 7.
Figure 9:
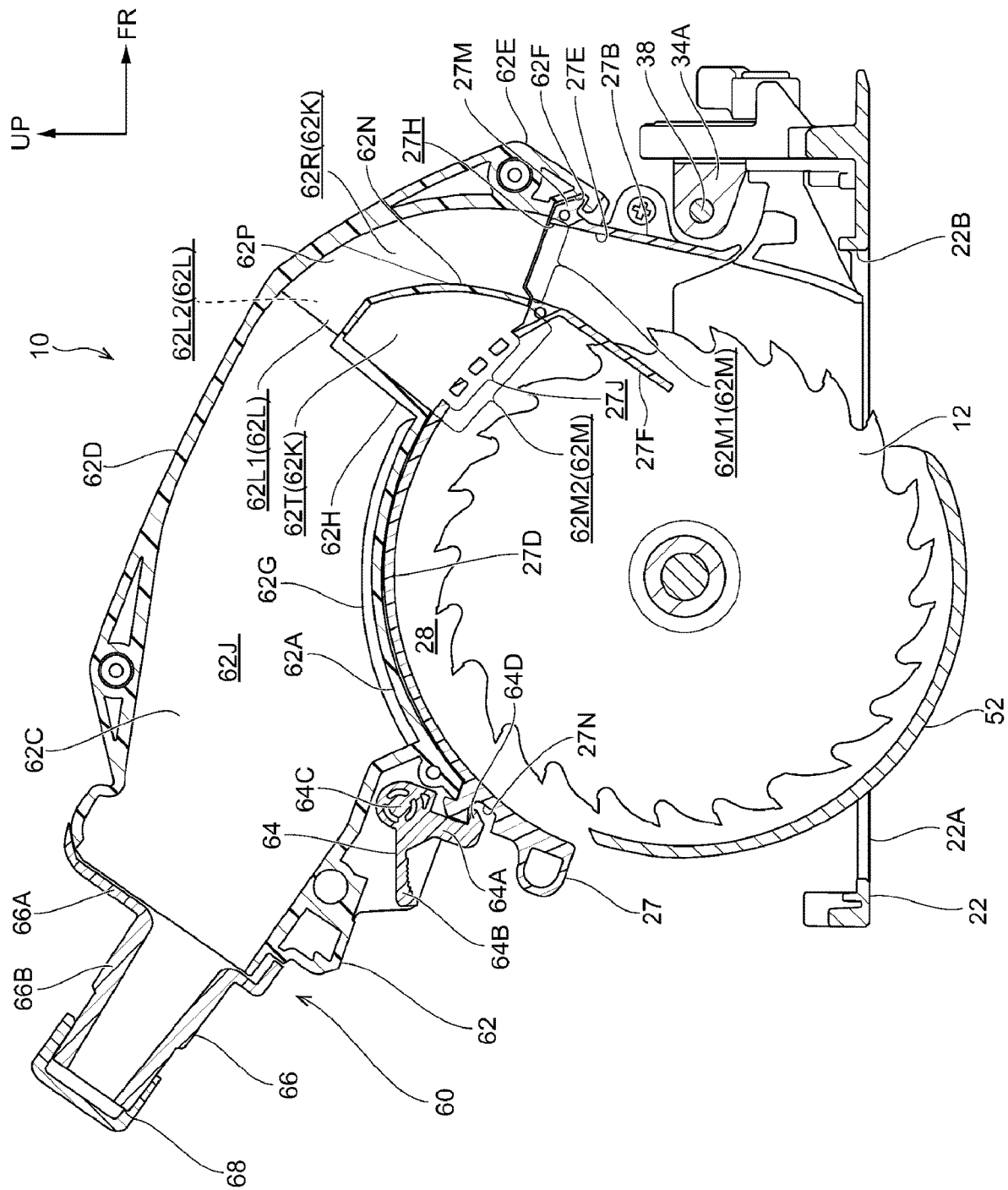
FIG. 9 is a sectional view when the inside of the dust collecting case in a minimum protrusion state of the circular saw shown in FIG. 7 is viewed from the right side.

Specifically, in the initial state of the circular saw 10 shown in FIG. 7, the link shaft 42 is arranged at the lower end part of the link groove 40C, and the downward protrusion amount of the circular saw blade 12 with respect to the base 22 is the maximum. On the other hand, by arranging the link shaft 42 at the upper end part of the link groove 40C, the downward protrusion amount of the circular saw blade 12 with respect to the base 22 is the smallest (the state shown in FIG. 9, and hereinafter, this state is referred to as the minimum protrusion state). A left end part of the link shaft 42 protrudes leftward from the link body part 40A, and a male screw is formed at the outer peripheral part of the left end part of the link shaft 42.

The fixing lever 43 is formed in a substantially long plate shape extending in the front-and-rear direction with the left-and-right direction as the plate thickness direction. A nut 44 is provided at the front end part of the fixing lever 43 and the nut 44 is screwed onto the left end part of the link shaft 42. A washer (not shown) is provided between the nut 44 and the link body part 40A. The saw cover part 25A (housing 24) is fixed to the link 40 via the link shaft 42 by rotating the fixing lever 43 and tightening the washer to the link body part 40A. That is, the rear end part of the housing 24 is connected to the base 22 via the link 40 and the rear connecting shaft 41. The link 40, the link body part 40A, the rear connecting shaft 41, the connection plate 34, the support shaft 38, the fixing lever 43, and the nut 44 are a part of the protrusion amount adjustment mechanism. Further, by releasing the fixed state of the fixing shaft 36 by the fixing arm 37 described above, the housing 24 can be rotated around the front connecting shaft 35 and the rear connecting shaft 41, and the angle of the circular saw blade 12 with respect to the base 22 can be changed. Specifically, although not shown, the housing 24 can be inclined to the right with respect to the base 22. The connection plate 34, the front connecting shaft 35, the fixing shaft 36, the fixing arm 37, the rear connecting shaft 41, the fixing wall 22C, and the fixing groove 22D are a part of an inclination mechanism.

(Regarding Drive Mechanism 46)

As shown in FIG. 5, the drive mechanism 46 includes a motor 47 and an output shaft 50. The motor 47 is accommodated in the body housing 25 and electrically connected to the control part 54 (which will be described later). The motor 47 has a rotating shaft 47A of which the left-and-right direction is the axial direction. A left end part of the rotating shaft 47A is rotatably supported by a first motor bearing 48 fixed to the body housing 25, and a right side part of the rotating shaft 47A is rotatably supported by a second motor bearing 49 fixed to the body housing 25. A right end part of the rotating shaft 47A protrudes rightward from the second motor bearing 49, and a pinion gear 47B is formed at the right end part of the rotating shaft 47A.

The output shaft 50 is arranged inside the body housing 25 with the left-and-right direction as the axial direction. Specifically, the output shaft 50 is arranged below the right end part of the rotating shaft 47A of the motor 47 and slightly on the rear side with respect to the rotating shaft 47A, and is rotatably supported by the body housing 25. At the left end part of the output shaft 50, an output gear (not shown) is provided to be rotatable integrally therewith.

Further, a transmission gear (deceleration mechanism) (not shown) is provided between the rotating shaft 47A and the output shaft 50. The transmission gear is configured as a two-stage gear and meshes with the pinion gear 47B of the rotating shaft 47A and the output gear of the output shaft 50. A right end part of the output shaft 50 is configured as a tool attachment part, and the tool attachment part is arranged within the tool accommodating space 28. The tool attachment part is formed in a substantially cylindrical shape that opens to the right, and a male screw is formed at the inner peripheral part of the tool attachment part. A center part of the circular saw blade 12 is externally fitted to the tool attachment part, and the circular saw blade 12 is fixed to the right end part of the output shaft 50 with a bolt BL. Accordingly, when the motor 47 is driven, the output shaft 50 and the circular saw blade 12 are configured to rotate around the output shaft 50.

A lower part of the circular saw blade 12 is covered with a protective cover 52 (refer to FIGS. 1 to 4). The protective cover 52 is formed in a substantially semicircular shape projecting downward in a right view, and is formed in a recessed shape that opens upward. In addition, the protective cover 52 is connected to the output shaft 50 to be rotatable around the output shaft 50 (refer to FIG. 5). Furthermore, the protective cover 52 is urged around the output shaft 50 by an urging spring (not shown) and held at the position shown in FIGS. 1 to 4. When the circular saw 10 is used for cutting, the protective cover 52 rotates to the other side around the output shaft 50 against the urging force of the urging spring due to the workpiece, exposing the blade part of the circular saw blade 12.

(Regarding Control Part 54)

Figure 3:
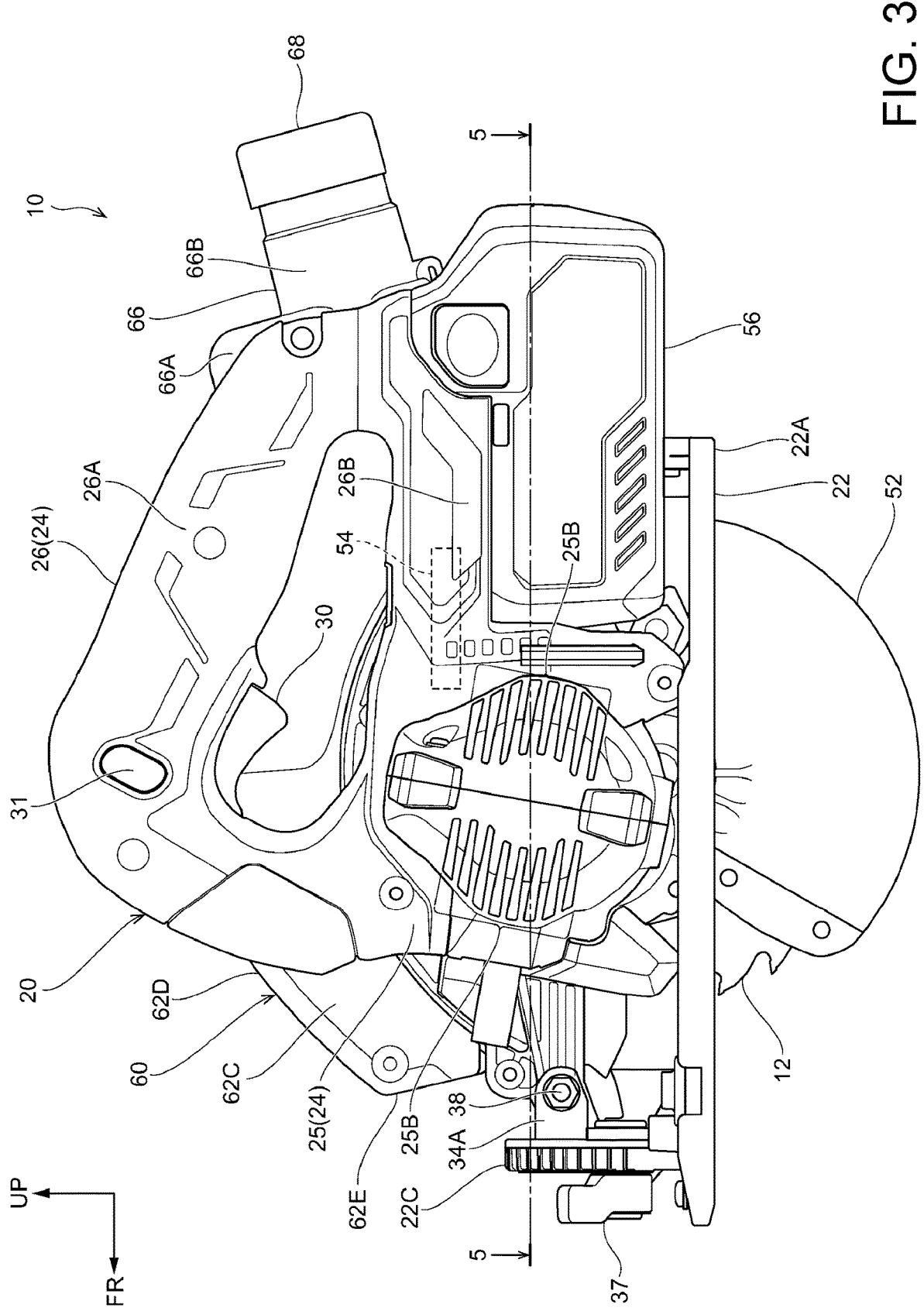
FIG. 3 is a side view when the circular saw shown in FIG. 1 is viewed from the left side.

As shown in FIG. 3, the control part 54 is accommodated within the front end part of the battery mounting part 26B in the handle housing 26. The switch mechanism of the trigger 30 and the motor 47 are electrically connected to the control part 54. As a result, when the trigger 30 is pulled, the motor 47 is driven and the circular saw blade 12 rotates around the output shaft 50.

(Regarding Battery Pack 56)

The battery pack 56 is formed in a substantially rectangular parallelepiped shape. The battery pack 56 is mounted on the battery mounting part 26B of the circular saw 10 from the rear side. Furthermore, the battery pack 56 has a connector (not shown), and in a state where the battery pack 56 is mounted, the connector is connected to the connector of the battery mounting part 26B, and power is supplied from the battery pack 56 to the control part 54.

(Regarding Dust Collecting Case 60)

As shown in FIGS. 1 to 3 and 6 to 13, the dust collecting case 60 is attachably and detachably attached to the inner cover 27 of the tool body 20 and arranged adjacent to the upper side of the inner cover 27. Sawdust discharged from the sawdust discharge part 27E of the inner cover 27 is accumulated in the dust collecting case 60. The dust collecting case 60 includes a case body 62, an attachment/detachment lever 64, and a lid member 66. The dust collecting case 60 is a part of the dust collection structure of the present invention.

(Regarding Case Body 62)

The case body 62 is formed in the shape of a hollow box that extends in the front-and-rear direction and is open rearward, and is curved in a substantially arc shape projecting upward, corresponding to the cover top wall 27D of the inner cover 27, in a side view. Specifically, the case body 62 includes a case bottom wall 62A, a case right wall 62B and a case left wall 62C as case side walls, a case top wall 62D, and a case front wall 62E. The case body 62 is composed of case members divided into two in the left-and-right direction, and these case members are assembled to each other. The rear part of the case left wall 62C has a shape recessed to the right such that the hand of the operator gripping the handle part 26A is less likely to touch the rear part.

As shown in FIGS. 7 to 10, the inner peripheral surface of the front end part of the case body 62 is curved in a substantially arc shape projecting obliquely upward to the front in a side view, and the lower end part at the front end part of the case body 62 is arranged adjacent to the upper side of the cover front wall 27B of the inner cover 27. An attachment groove part 62F (refer to FIGS. 7 and 8) opened rearward is formed at the lower end part of the front end part of the case body 62. The cover projection 27M of the inner cover 27 is arranged in the attachment groove part 62F, and the cover projection 27M and the attachment groove part 62F are engaged with each other in the up-and-down direction. As a result, the upward movement of the front end part of the case body 62 is restricted. The front part of the case bottom wall 62A is curved in a substantially arc shape projecting upward, corresponding to the cover top wall 27D of the inner cover 27, and on the case bottom wall 62A, engagement grooves 62G opened downward are formed at positions corresponding to the first rib 27K and the second rib 27L of the inner cover 27. The engagement groove 62G extends in the front-and-rear direction, the first rib 27K and the second rib 27L are inserted into the engagement groove 62G, and the case body 62 and the inner cover 27 are engaged with each other in the left-and-right direction (refer to FIG. 12). Further, the right end part of the case bottom wall 62A is bent downward to cover the upper outer peripheral part of the inner cover 27 from the right side, and the lower end part of the case right wall 62B is bent leftward to be connected to right end part of the case bottom wall. 62A (refer to FIG. 12).

Figure 11:
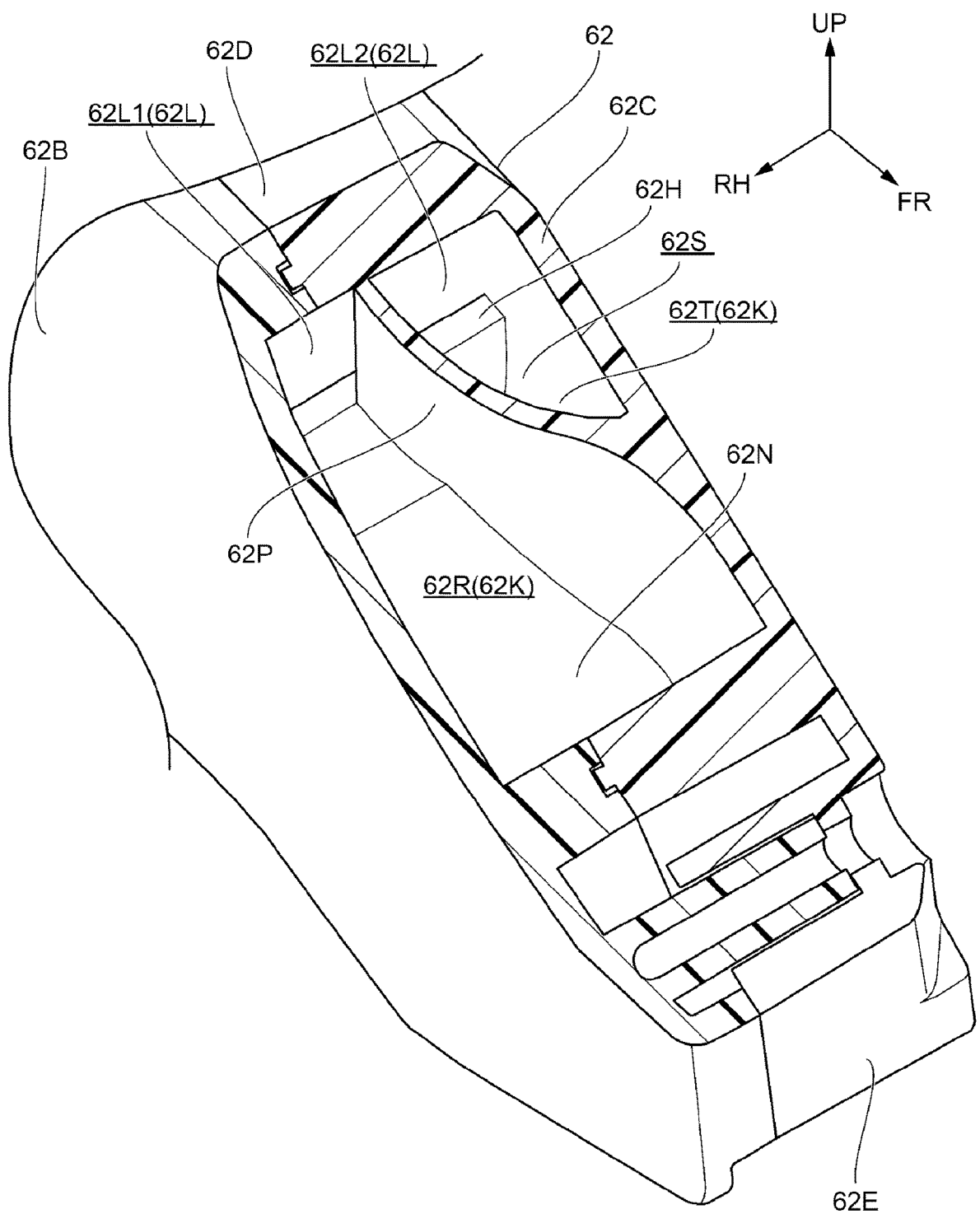
FIG. 11 is a partially cut perspective view showing the inside at the front part of the dust collecting case shown in FIG. 1.
Figure 12:
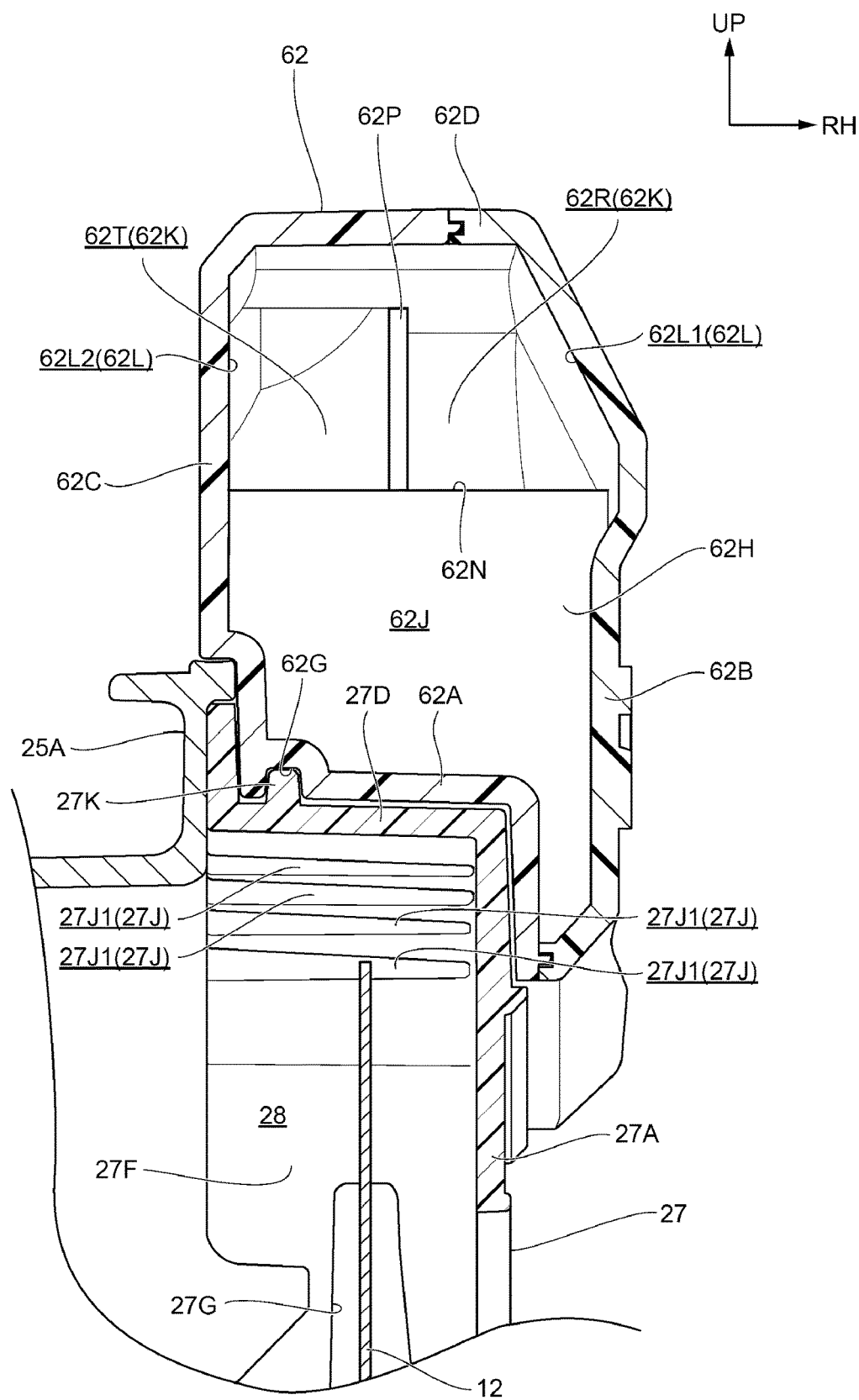
FIG. 12 is a sectional view (sectional view taken along line 12-12 in FIG. 7) when a middle part in the front-and-rear direction of the dust collecting case shown in FIG. 7 is viewed from the rear side.

As also shown in FIGS. 11 and 12, a case partition wall 62H is formed inside the case body 62 at the front end part thereof. The case partition wall 62H is formed in a rectangular plate shape of which the substantial front-and-rear direction (more specifically, the direction from the upper rear to the lower front) is the plate thickness direction, and the inside of the case body 62 is partitioned in the front-and-rear direction by the case partition wall 62H. The rear part of the case body 62 (the part on the rear side of the case partition wall 62H) is configured as a dust collecting chamber 62J, and the front part of the case body 62 (the part on the front side of the case partition wall 62H) is configured as a dust collecting passage part 62K. Note that the case partition wall 62H is arranged in front of the center part of the circular saw blade 12 in a side view. A dust collecting chamber inlet/outlet 62L is formed in a penetrating manner at the upper end part of the case partition wall 62H, and the dust collecting chamber inlet/outlet 62L is arranged adjacent to the lower side of the case top wall 62D, and extends in the left-and-right direction from the case right wall 62B to the case left wall 62C. That is, the dust collecting chamber 62J and the dust collecting passage part 62K are communicated with each other by the dust collecting chamber inlet/outlet 62L. The case partition wall 62H is an example of a first partition part in the present invention. The case partition wall 62H functions as a division part that partitions the transfer part and the storage part in the present invention.

A case opening 62M is formed in a penetrating manner at the front part of the case bottom wall 62A (a part on the front side of the case partition wall 62H), and the case opening 62M is arranged on the upper side of the sawdust discharge port 27H and the cover opening 27J of the inner cover 27. That is, the dust collecting passage part 62K is opened downward by the case opening 62M.

A split wall 62N for splitting the inside of the dust collecting passage part 62K is formed in the dust collecting passage part 62K. The split wall 62N extends forward from the lower edge part of the dust collecting chamber inlet/outlet 62L in a side view, and the front part of the split wall 62N is inclined downward toward the front side, and is curved in a substantially arc shape to be projected obliquely upward to the front. The front end part of the split wall 62N is arranged adjacent to the upper side of the division wall 27F of the inner cover 27, and is arranged at the middle part in the front-and-rear direction of the case opening 62M (refer to FIGS. 7 and 8). As a result, the case opening 62M is partitioned into a case inlet 62M1 that forms a front part of the case opening 62M and a case outlet 62M2 that forms a rear part of the case opening 62M. That is, the split wall 62N partitions an inflow passage 62R (inflow part) and an exhaust passage 62T (outflow part) in the front-and-rear direction. The case inlet 62M1 is arranged above the sawdust discharge port 27H of the inner cover 27, and the case outlet 62M2 is arranged above the cover opening 27J of the inner cover 27. The split wall 62N is an example of a second partition part that partitions the space of the transfer part in the present invention.

Furthermore, in the dust collecting passage part 62K, a guide wall 62P (refer to FIGS. 10 to 12) is formed as a guide part between the split wall 62N and the case top wall 62D, and the guide wall 62P extends substantially in the front-and-rear direction with the left-and-right direction as the plate thickness direction. The rear end part of the guide wall 62P is arranged at the middle part in the left-and-right direction of the dust collecting chamber inlet/outlet 62L, and the guide wall 62P partitions the dust collecting chamber inlet/outlet 62L into a dust collecting chamber inlet 62L1 as an inlet that forms the right side part of the dust collecting chamber inlet/outlet 62L and a dust collecting chamber outlet 62L2 as an outlet that forms the left side part of the dust collecting chamber inlet/outlet 62L. That is, the guide wall 62P partitions the inflow passage 62R (inflow part) and an exhaust passage 62T (outflow part) (which will be described later) in the left-and-right direction. In addition, the position of one end of the inlet (dust collecting chamber inlet 62L1) in the left-and-right direction and the position of one end of the outlet (dust collecting chamber outlet 62L2) in the left-and-right direction are configured to be different from each other by the guide wall 62P. In addition, positions of the other ends of the dust collecting chamber inlet 62L1 and the dust collecting chamber outlet 62L2 also differ from each other in the left-and-right direction. The guide wall 62P is an example of a third partition part that partitions the space of the transfer part in the present invention.

As a result, the dust collecting chamber inlet 62L1 and the dust collecting chamber outlet 62L2 are arranged side by side in the left-and-right direction. Therefore, in a state where the housing 24 is not inclined to the right with respect to the base 22, in both the initial state and the minimum protrusion state of the circular saw 10, the dust collecting chamber inlet 62L1 and the dust collecting chamber outlet 62L2 are arranged at overlapping positions in the up-and-down direction. In other words, at least a part of the dust collecting chamber inlet 62L1 and at least a part of the dust collecting chamber outlet 62L2 are at the same position in the up-and-down direction. Further, even in a state where the housing 24 is inclined to the right with respect to the base 22, in both the initial state and the minimum protrusion state of the circular saw 10, a part of the dust collecting chamber inlet 62L1 and a part of the dust collecting chamber outlet 62L2 are arranged at overlapping positions in the up-and-down direction. In addition, the opening area of the dust collecting chamber inlet 62L1 is set to 80% to 120% of the opening area of the dust collecting chamber outlet 62L2 (in the present embodiment, the opening area of the dust collecting chamber inlet 62L1 and the opening area of the dust collecting chamber outlet 62L2 are set to be substantially the same area).

Further, the guide wall 62P is inclined leftward toward the front side, and the front end part of the guide wall 62P is connected to the case left wall 62C of the case body 62. As a result, at the dust collecting passage part 62K, the inflow passage 62R having the case inlet 62M1 at one end part and the dust collecting chamber inlet 62L1 at the other end part is formed, and the dust collecting chamber 62J and the sawdust discharge part 27E of the inner cover 27 are communicated with each other by the inflow passage 62R. That is, the inflow passage 62R is a passage that connects the case inlet 62M1 and the dust collecting chamber inlet 62L1 positioned behind the case inlet 62M1. The flow passage area of the inflow passage 62R is set to decrease toward the side of the dust collecting chamber inlet 62L1 (flow passage downstream side) by the guide wall 62P. That is, the flow passage area on the downstream side of the inflow passage 62R is set smaller than the flow passage area on the upstream side of the inflow passage 62R.

On the split wall 62N, an exhaust hole part 62S is formed in a penetrating manner at a part surrounded by the guide wall 62P and the case left wall 62C. As a result, at the dust collecting passage part 62K, the exhaust passage 62T having the case outlet 62M2 at one end part and the dust collecting chamber outlet 62L2 at the other end part is formed, and the dust collecting chamber 62J and the cover opening 27J of the inner cover 27 are communicated with each other by the exhaust passage 62T. That is, the exhaust passage 62T is a passage that connects the case outlet 62M2 and the dust collecting chamber outlet 62L2 positioned behind the case outlet 62M2.

(Regarding Attachment/Detachment Lever 64)

Figure 10:
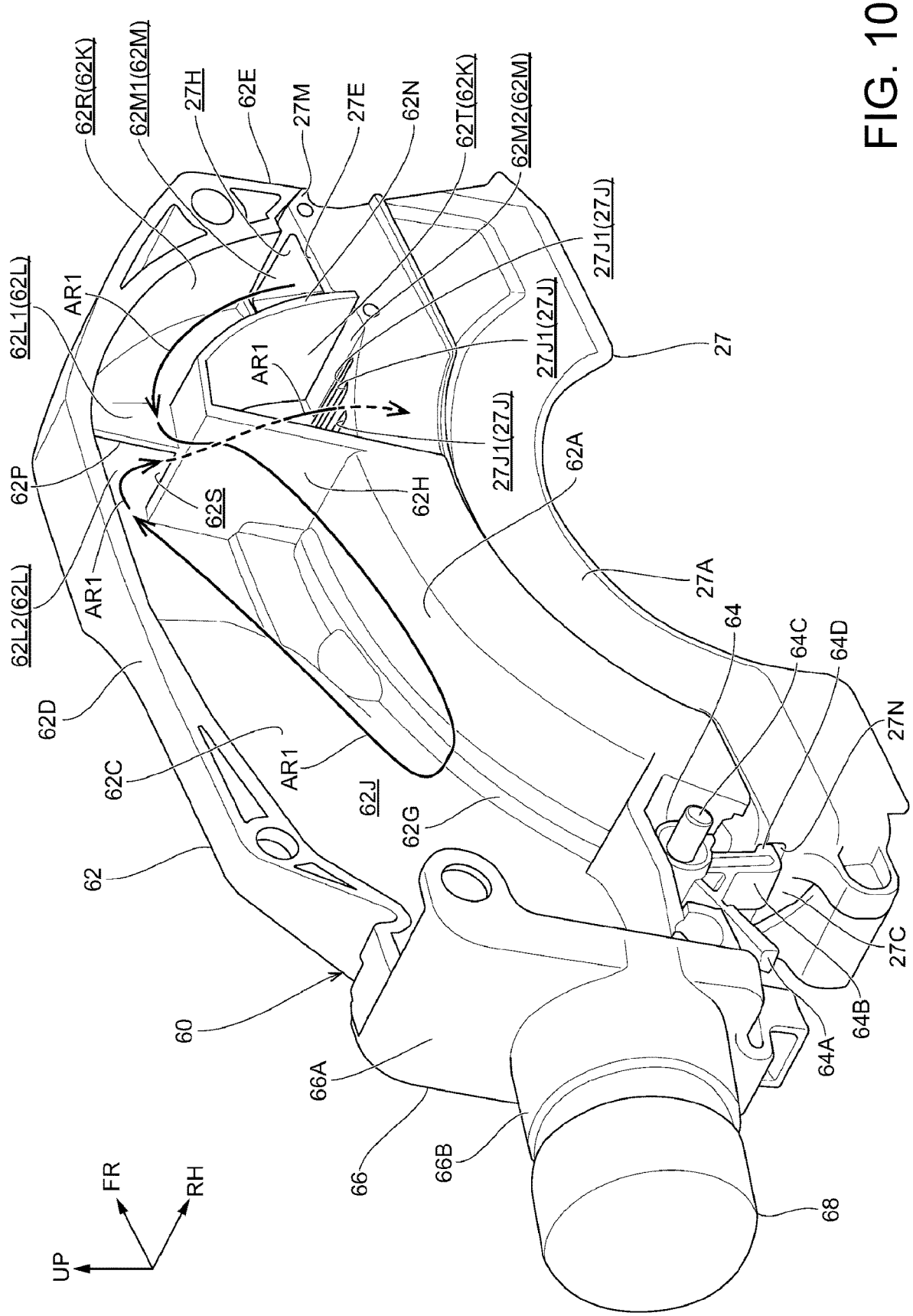
FIG. 10 is a perspective view when the dust collecting case shown in FIG. 1 is viewed obliquely from the rear right in a state where a case member on the right side of a case body is removed.

As shown in FIGS. 7 and 10, the attachment/detachment lever 64 is formed in a substantially V-shaped block shape that is opened obliquely downward to the rear in a side view. Specifically, the attachment/detachment lever 64 includes an engaging arm 64A extending in the up-and-down direction, and a handle lever part 64B extending obliquely downward to the rear from the upper end part of the engaging arm 64A. A lever shaft 64C of which the left-and-right direction is the axial direction is formed at the upper end part of the engaging arm 64A, and the lever shaft 64C protrudes from the attachment/detachment lever 64 to the outside respectively in the left-and-right direction. The lever shaft 64C is rotatably connected to the case body 62 at the rear lower end part of the case body 62. The attachment/detachment lever 64 is urged counterclockwise in a right view by a spring (not shown).

A hook part 64D protruding forward is formed at the lower end part of the engaging arm 64A. The hook part 64D is inserted into the attachment groove part 27N of the inner cover 27, and the hook part 64D and the attachment groove part 27N are engaged with each other in the up-and-down direction. As a result, the upward movement of the rear end part of the dust collecting case 60 restricted. Then, the operator grips the handle lever part 64B, rotates the attachment/detachment lever 64 clockwise in a right view, and releases the engaged state between the hook part 64D and the attachment groove part 27N, and accordingly, the dust collecting case 60 is removed from the inner cover 27.

(Regarding Lid Member 66)

The lid member 66 includes a lid body part 66A that forms the front part of the lid member 66, and a lid tube part 66B that forms the rear part of the lid member 66. The lid body part 66A is formed in a substantially rectangular box shape that is open to the front side. A lid body part 66A is connected to the rear end part of the case body 62 to block the rear end part of the case body 62. Specifically, the upper end part of the lid body part 66A is rotatably connected to the upper end part of the rear end part of the case body 62 with the left-and-right direction as the axial direction.

The lid tube part 66B is formed in a substantially cylindrical shape of which the front-and-rear direction is the axial direction, and protrudes rearward from the lid body part 66A. Further, the inside of the lid tube part 66B and the inside of the lid body part 66A communicate with each other, and a bottomed cylindrical cap 68 is attached to the rear end part of the lid tube part 66B.

(Regarding Dust Collecting Adapter 70)

Figure 16:
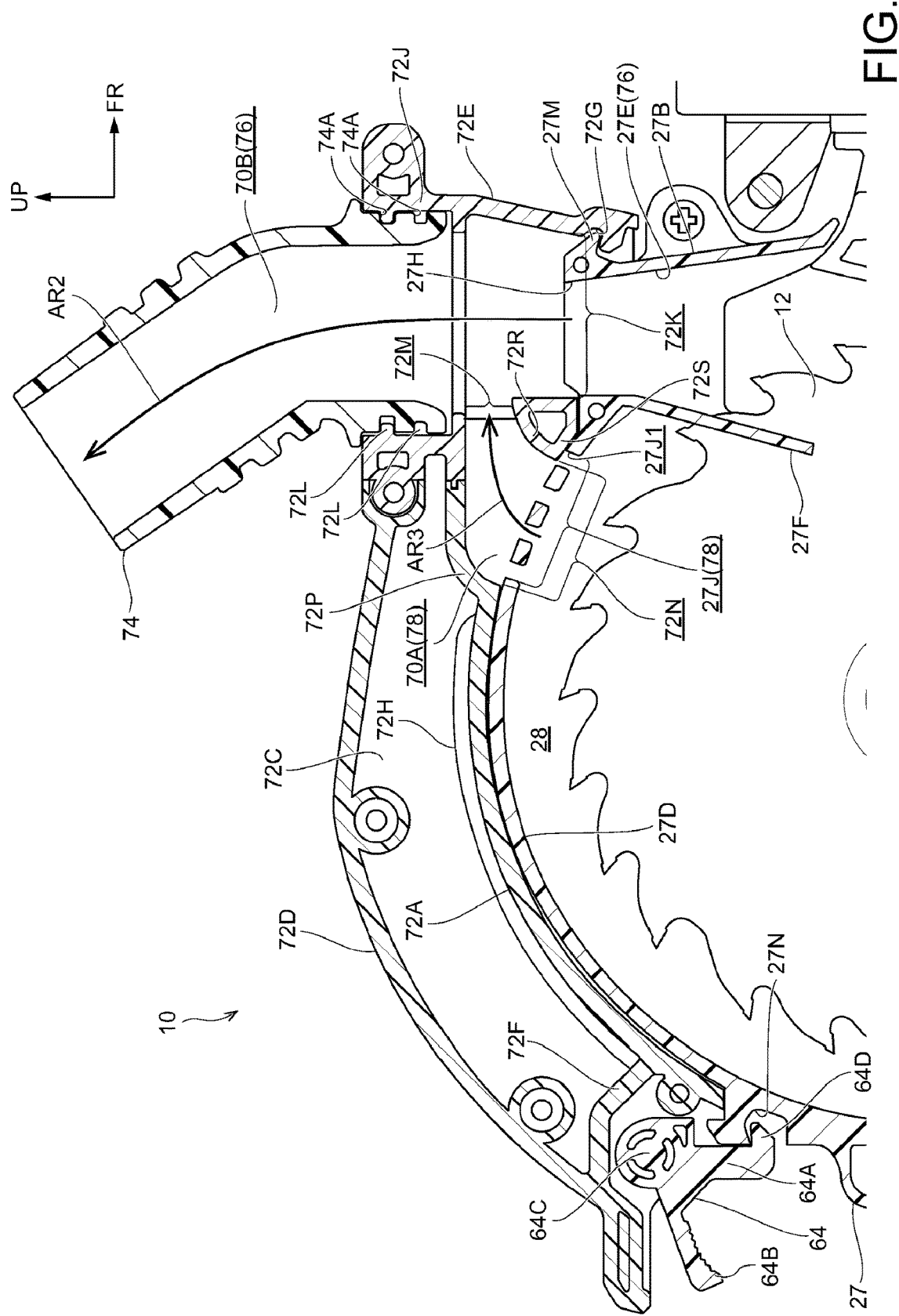
FIG. 16 is a sectional view when the inside of the dust collecting adapter in an initial state of the circular saw shown in FIG. 15 is viewed from the right side.

As shown in FIGS. 15 and 16, when a power-driven dust collecting device (not shown) is used to suction sawdust during cutting, the dust collecting adapter 70 is mounted on the inner cover 27 of the tool body 20 instead of the dust collecting case 60. When mounting the dust collecting adapter 70 on the inner cover 27, similar to the dust collecting case 60, the dust collecting adapter 70 is arranged adjacent to the upper side of the inner cover 27. In the dust collection mode using the dust collecting adapter 70, the sawdust discharged from the sawdust discharge port 27H and the cover opening 27J of the inner cover 27 is discharged to the dust collecting device (outside the dust collecting adapter 70) through the dust collecting adapter 70. The dust collecting adapter 70 includes an adapter body 72 and an adapter connection part 74. Similar to the dust collecting case 60, the attachment/detachment lever 64 is provided in the adapter body 72.

(Adapter Body 72)

Similar to the case body 62 of the dust collecting case 60, the adapter body 72 is formed in the shape of a hollow box that extends in the front-and-rear direction, and is curved in a substantially arc shape projecting upward, corresponding to the cover top wall 27D of the inner cover 27, in a side view. Specifically, the adapter body 72 includes an adapter bottom wall 72A, an adapter right wall 72B, an adapter left wall 72C, an adapter top wall 72D, an adapter front wall 72E, and an adapter rear wall 72F. The adapter body 72 is composed of adapter members divided into two in the left-and-right direction, and these adapter members are assembled to each other. A lower end part of the adapter right wall 72B protrudes downward from the adapter bottom wall 72A to cover the outer peripheral part of the upper end of the cover side wall 27A of the inner cover 27 from the right side.

An attachment groove part 72G that opens rearward is formed at the lower end part of the adapter front wall 72E. The cover projection 27M of the inner cover 27 is arranged in the attachment groove part 72G, and the cover projection 27M and the attachment groove part 72G are engaged with each other in the up-and-down direction. As a result, the upward movement of the front end part of the adapter body 72 is restricted. The attachment/detachment lever 64 is provided at the rear end part of the adapter body 72 to be rotatable with the left-and-right direction as the axial direction, and the hook part 64D of the attachment/detachment lever 64 is engaged with the attachment groove part 27N of the inner cover 27. As a result, the upward movement of the rear end part of the adapter body 72 is restricted.

The adapter bottom wall 72A is curved in a substantially arc shape projecting upward, corresponding to the cover top wall 27D of the inner cover 27, and on the adapter bottom wall 72A, engagement grooves 72H opened downward are formed at positions corresponding to the first rib 27K and the second rib 27L of the inner cover 27. Although not shown, the first rib 27K and the second rib 27L are inserted into the engagement groove 72H, and the adapter body 72 and the inner cover 27 are engaged with each other in the left-and-right direction.

At the front end part of the adapter body 72, a tubular connection tube part 72J of which the up-and-down direction is the axial direction is formed. The upper end part of the connection tube part 72J is formed in a substantially cylindrical shape and protrudes upward from the adapter top wall 72D. On the inner peripheral surface of the upper end part of the connection tube part 72J, a pair of upper and lower rail parts 72L protruding radially inward are formed, and the rail parts 72L extend over the entire peripheral direction of the connection tube part 72J.

The lower part of the connection tube part 72J is formed in a substantially rectangular tubular shape. More specifically, the lower peripheral wall of the connection tube part 72J is composed of a part of the adapter right wall 72B, the adapter left wall 72C, and the adapter front wall 72E. The connection tube part 72J penetrates in the up-and-down direction, and a lower end opening of the connection tube part 72J is configured as a main suction port 72K. The upper end part of the sawdust discharge part 27E of the inner cover 27 is inserted into the main suction port 72K.

A communication hole 72M penetrating in the front-and-rear direction is formed on the lower rear wall of the connection tube part 72J, and the communication hole 72M is formed in a substantially rectangular shape with the left-and-right direction as the longitudinal direction. Further, on the adapter bottom wall 72A, a sub-suction port 72N is formed in a penetrating manner on the rear side of the connection tube part 72J, and the sub-suction port 72N is arranged above the cover opening 27J of the inner cover 27.

On the inside of the adapter body 72, first connection wall 72P that connects the upper edge part of the communication hole 72M and the rear edge part of the sub-suction port 72N is formed, the first connection wall 72P extends rearward from the communication hole 72M, and the rear end part of the first connection wall 72P is bent obliquely downward to the rear. On the inside of the adapter body 72, second connection wall 72R that connects the lower edge part of the communication hole 72M and the front edge part of the sub-suction port 72N is formed, the second connection wall 72R extends obliquely downward to the rear from the communication hole 72M. The first connection wall 72P and the second connection wall 72R are connected to the adapter right wall 72B and the adapter left wall 72C. Accordingly, in the adapter body 72, a sub-suction passage 70A as a second discharge passage having the sub-suction port 72N at one end part and the communication hole 72M at the other end is formed.

The adapter connection part 74 is formed in a substantially cylindrical shape of which the up-and-down direction and the axial direction, and the upper part of the adapter connection part 74 is inclined rearward toward the upper side. A hose of the dust collecting device is connected to the upper end part of the adapter connection part 74. The lower end part of the adapter connection part 74 is rotatably inserted into the upper end part of the connection tube part 72J of the adapter body 72. At the outer peripheral part of the lower end part in the adapter connection part 74, a pair of upper and lower rail grooves 74A that open radially outward of the adapter connection part 74 are formed, and the rail grooves 74A extend over the entire peripheral direction of the adapter connection part 74. The rail part 72L of the adapter body 72 is rotatably inserted into the rail groove 74A. Thereby, the lower end part of the adapter connection part 74 is rotatably connected to the adapter body 72 with the up-and-down direction as the axial direction. That is, the inside of the adapter connection part 74 and the inside of the lower end part of the connection tube part 72J are communicated with each other, and the communicated part is configured as a main suction passage 70B that serves as a first discharge passage.

Then, a first dust collecting passage 76 that allows communication between the inside of the inner cover 27 (that is, inside the inner cover 27, the tool accommodating space 28) and the outside of the dust collecting adapter 70 (that is, the dust collecting device) by the sawdust discharge part 27E and the main suction passage 70B of the inner cover 27. The first dust collecting passage 76 extends substantially in the up-and-down direction, and sawdust in the tool accommodating space 28 is delivered toward the dust collecting device through the first dust collecting passage 76.

A second dust collecting passage 78 that communicates between the tool accommodating space 28 and the main suction passage 70B is formed by the sub-suction passage 70A of the dust collecting adapter 70 and the cover opening 27J of the inner cover 27. Thus, the second dust collecting passage 78 is arranged downstream of the first dust collecting passage 76 in the rotational direction of the circular saw blade 12 and connected to the first dust collecting passage 76. Sawdust that has not been inserted into the first dust collecting passage 76 is discharged to the main suction passage 70B through the second dust collecting passage 78 and delivered toward the dust collecting device together with the sawdust in the main suction passage 70B.

Further, in the first dust collecting passage 76, the flow passage area is set to be the smallest at the part of the sawdust discharge port 27H of the sawdust discharge part 27E, and in the second dust collecting passage 78, the flow passage area is set to be the smallest at the part of the communication hole 72M. Furthermore, the minimum flow passage area of the second dust collecting passage 78 is set to be equal to or less than the minimum flow passage area of the first dust collecting passage 76.

Further, in the dust collecting adapter 70, a cover part 72S that connects the lower end part of the second connection wall 72R and the lower end part of the rear wall of the connection tube part 72J is formed. The cover part 72S is arranged above the opening hole part 27J1 which is arranged on the frontmost side (upstream side in the rotational direction of the circular saw blade 12) in the cover opening 27J of the inner cover 27, and the opening hole part 27J1 can be blocked from above. As a result, the opening area of the cover opening 27J when the dust collecting adapter 70 is mounted on the inner cover 27 is smaller than the opening area of the cover opening 27J when the dust collecting case 60 is mounted on the inner cover 27.

(Action and Effect)

Next, the action and effect of the present embodiment will be described while describing dust collection of sawdust when the dust collecting case 60 and the dust collecting adapter 70 are mounted on the tool body 20.

When using the circular saw 10 configured as described above, the base 22 is placed on the workpiece and the trigger 30 is pulled. As a result, the motor 47 is driven, and the driving force of the motor 47 is transmitted to the circular saw blade 12 such that the circular saw blade 12 rotates together with the output shaft 50. By moving the circular saw 10 forward, the workpiece is cut.

(Regarding Dust Collection Using Dust Collecting Case 60)

When cutting a workpiece, sawdust produced during cutting is picked up above the circular saw blade 12 by the rotational force of the circular saw blade 12. Also, due to the rotational force of the circular saw blade 12 and the movement of sawdust, an air flow that flows from the tool accommodating space 28 into the dust collecting case 60 is produced. Thereby, as shown in FIGS. 7 and 10, the sawdust flows into the dust collecting case 60 together with the air. The air flowing inside the dust collecting case 60 is indicated as AR1. The air AR1 flows inside the dust collecting case 60 as indicated by arrows. Specifically, the sawdust flow into the inflow passage 62R of the dust collecting case 60 from the sawdust discharge part 27E of the inner cover 27 together with the air AR1. Then, the sawdust and the air AR1 that have flowed into the inflow passage 62R are discharged into the dust collecting chamber 62J from the dust collecting chamber inlet 62L1, and the sawdust is accumulated in the dust collecting chamber 62J. More specifically, the sawdust that has entered the dust collecting chamber 62J from the dust collecting chamber inlet 62L1 is accumulated to be piled on the upper side of the case bottom wall 62A. Also, the air AR1 delivered into the dust collecting chamber 62J is exhausted from the dust collecting chamber outlet 62L2 to the exhaust passage 62T. Then, the air AR1 exhausted to the exhaust passage 62T is exhausted into the tool accommodating space 28 through the cover opening 27J of the inner cover 27.

Figure 14:
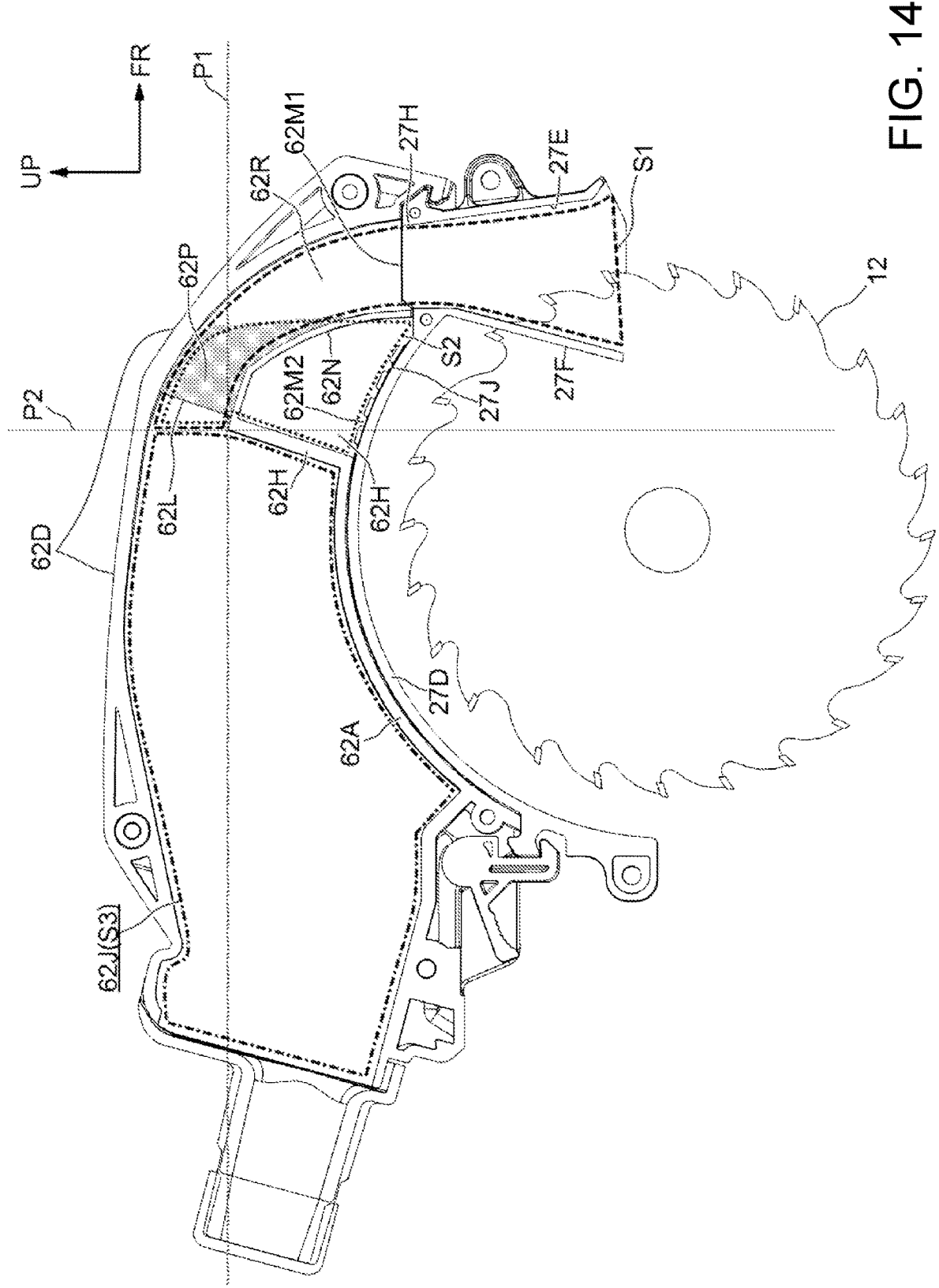
FIG. 14 is a view showing an inflow part, an outflow part, and a storage part of the dust collection structure in the present invention.

The state of dust collection according to the present invention will be described in more detail with reference to FIG. 14. FIG. 14 shows the inner cover 27 and the dust collecting case 60 that form the dust collection structure of the present invention, and also shows the saw blade 12. FIG. 14 shows a state where a sectional view of the dust collection structure (the inner cover 27 and the dust collecting case 60) of the present invention, which is taken along a plane extending in the front-and-rear and up-and-down directions and passing through the right side of the guide wall 62P and the left side of the right end of the case partition wall 62H, is viewed from a right side. In FIG. 14, a passage through which sawdust (work chips) produced during the processing and air flow and move to the dust collecting chamber 62J is indicated as an inflow part S1, and a passage through which air flows to the outside (tool accommodating space 28) of the dust collection structure from the dust collecting chamber 62J is described as an outflow part S2. Also, the dust collecting chamber 62J is described as a dust collecting space S3 in order to make it easy to understand that the dust collecting chamber 62J is spatially separated from the inflow part S1 and the outflow part S2. The inflow part S1 is a space extending from the lower end opening of the sawdust discharge part 27E to the dust collecting chamber inlet/outlet 62L (dust collecting chamber inlet 62L1), and includes the sawdust discharge port 27E, the sawdust discharge port 27H, the case inlet 62M1, the inflow passage 62R, and the dust collecting chamber inlet 62L1. The lower end opening of the sawdust discharge part 27E is the inflow inlet (starting end of the inflow part) in the present invention, and the dust collecting chamber inlet 62L1 is an inflow outlet (terminal end of the inflow part) in the present invention. The outflow part S2 is a space extending from the dust collecting chamber inlet/outlet 62L (dust collecting chamber outlet 62L2) to the cover opening 27J, and includes the dust collecting chamber outlet 62L2, the exhaust passage 62T, the case outlet 62M2, and the cover opening 27J. The dust collecting chamber outlet 62L2 is the outflow inlet (starting end of the outflow part) in the present invention, and the cover opening 27J is the outflow outlet (terminal end of the outflow part) in the present invention. The inflow part S1 and the outflow part S2 are a part of the transfer part in the present invention, and the dust collecting chamber 62J (dust collecting space S3) is an example of the storage part in the present invention. The inflow part S1 and the outflow part S2 are spaces (passages) through which sawdust or air moves. As shown in FIG. 14, the inflow part S1 and the outflow part S2 are partitioned by the split wall 62N and the guide wall 62P. The inflow part S1 and the outflow part S2 are partitioned left and right by the guide wall 62P. In order to make it easy to understand the region partitioned by the guide wall 62P, the area of the guide wall 62P in FIG. 14 is filled with a dot pattern. Further, the inflow part S1 and the outflow part S2 are partitioned in the front-and-rear and the up-and-down directions by the split wall 62N. The inflow part S1 is indicated by a dashed line. The outflow part S2 is indicated by a dotted line. The dust collecting space S3 is indicated by a dot-and-dash line.

The circular saw 10 is a work machine that performs cutting work toward the front, and sawdust is produced around the end part (front end) in the working direction of the tip tool. In order to inhibit the deterioration of visibility to the work location and the deterioration of workability due to the enlargement of the body, it is preferable that at least most of the part that collects (stores) sawdust be provided in a region behind the location where sawdust is produced. In addition, in order to collect sawdust by utilizing the gravitational action, the dust collecting chamber should have a container shape having a bottom part at least on the lower side. Therefore, in the dust collection structure in the present invention, the case partition wall 62H connected to the lower part (case bottom wall 62A) of the dust collection structure (dust collecting case 60) and extending upward is provided to divide the dust collecting chamber 62J. (dust collecting space S3) and the transfer part (inflow part S1, outflow part S2), and to form the dust collecting chamber 62J in a container shape. Further, the case partition wall 62H extends upward, but is configured not to be connected to the case top wall 62D, thereby forming the dust collecting chamber inlet/outlet 62L as a communication part. Therefore, the sawdust produced at the lower part of the tool insertion part 22B moves upward due to the force of cutting and the flow of air produced by the rotation of the saw blade 12 and passes through the sawdust discharge part 27E, passes through the inflow passage 62R and moves upward exceeding an up-and-down position P1 (height) of the upper end of the case partition wall 62H, and moves rearward from there and exceeds a front-and-rear position P2 of the upper end of the case partition wall 62H. The sawdust is held in the dust collecting chamber 62J by the gravitational action at the time when sawdust is positioned behind the front-and-rear position P2. In other words, when the force of the sawdust or the flow of air that assists the movement of the sawdust is lost in a state where the sawdust is positioned in front of the front-and-rear position P2, the sawdust moves downward inside the inflow passage 62R, is discharged to the tool accommodating space 28, and is not collected. Therefore, in order to realize optimal dust collection, it is important to move the sawdust rearward from the front-and-rear position P2. The air that has flowed into the dust collecting chamber 62J (S3) is discharged to the outside of the dust collecting chamber 62J (S3) by the outflow part S2.

In this manner, in the circular saw 10 on which the dust collecting case 60 is mounted, the sawdust discharge port 27H for delivering the sawdust in the tool accommodating space 28 toward the dust collecting chamber 62J of the dust collecting case 60, and the cover opening 27J for delivering the air AR1 exhausted from the dust collecting chamber 62J into the tool accommodating space 28, are formed in the inner cover 27. In the dust collecting case 60, the dust collecting chamber inlet 62L1 for delivering sawdust discharged from the sawdust discharge port 27H to the dust collecting chamber 62J, and the dust collecting chamber outlet 62L2 for delivering the air AR1 in the dust collecting chamber 62J to the cover opening 27J, are formed. As a result, the sawdust in the tool accommodating space 28 can be delivered into the dust collecting chamber 62J through the sawdust discharge port 27H and the dust collecting chamber inlet 62L1, and accumulated in the dust collecting chamber 62J. Further, the air AR1 delivered into the dust collecting chamber 62J together with the sawdust can be delivered toward the tool accommodating space 28 through the dust collecting chamber outlet 62L2 and the cover opening 27J. That is, the air AR1 delivered into the dust collecting case 60 together with sawdust during cutting can be returned to the tool accommodating space 28. As a result, it is possible to inhibit the pressure in the dust collecting chamber 62J from increasing. In addition, since the inflow part S1 and the outflow part S2 are integrated at the front part of the dust collection structure, it is easy to secure the internal space of the dust collecting chamber 62J (S3). In a case where the cover opening 27J is provided behind the center of the saw blade 12 (the shaft center of the output shaft 50), it is necessary to provide an air passage at the lower part of the dust collecting chamber 62J. Accordingly, there is a concern that the internal space of the dust collecting chamber 62J will be smaller or that the dust collecting case 60 will increase in size upward. However, according to the present embodiment, it is possible to inhibit such a situation.

Moreover, the dust collecting chamber inlet 62L1 and the dust collecting chamber outlet 62L2 are positioned above the up-and-down position P1 (height) of the upper end of the case partition wall 62H. Therefore, in a case where the dust collecting space is formed below the dust collecting chamber inlet 62L1 and the dust collecting chamber outlet 62L2 as in the present embodiment, a large volume of the dust collecting space (dust collecting chamber 62J) can be secured, and it is possible to inhibit sawdust discharged from the dust collecting chamber inlet 62L1 into the dust collecting chamber 62J from flowing back from the dust collecting chamber 62J to the dust collecting chamber outlet 62L2. As described above, according to the circular saw 10 of the present embodiment, it is possible to optimally collect sawdust into the dust collecting chamber 62J. Further, the case partition wall 62H extending upward from the lower part of the dust collecting case 60 is configured to be inclined forward. In other words, the upper end of the case partition wall 62H is positioned forward of the lower end. Thereby, a larger space can be secured in the dust collecting chamber 62J. Even in a case where the protrusion amount of the circular saw blade 12 is the smallest, the case partition wall 62H is set not to be horizontal (parallel to the sliding surface 22A of the base 22), thereby inhibiting dust leakage.

Further, as described above, in a case where the dust collecting case 60 is mounted on the tool body 20, the air AR1 delivered into the dust collecting chamber 62J during cutting returns to the tool accommodating space 28 inside the inner cover 27. Therefore, for example, compared to a configuration in which the air AR1 delivered into the dust collecting chamber 62J is exhausted from the case right wall 62B or the case top wall 62D to the outside of the case body 62, it is possible to inhibit the exhausted air AR1 from hindering the work of the operator. Specifically, in a case where the air is discharged from the case right wall 62B or the case top wall 62D, there is a concern that the dust piled in the surroundings will scatter, but in the present embodiment, it is possible to inhibit such a concern. As a result, workability during cutting can be improved as compared with the exhaust mode.

Further, as shown in FIG. 14 and the like, the dust collecting chamber inlet 62L1 and the dust collecting chamber outlet 62L2 are configured to overlap each other in the up-and-down direction. That is, at least a part of the dust collecting chamber inlet 62L1 and at least a part of the dust collecting chamber outlet 62L2 are configured to be arranged at the same position in the up-and-down direction. This positional relationship is maintained even in a case where the protrusion amount of the circular saw blade 12 is reaches the smallest. By doing so, it is easy to position the lower end position of the dust collecting chamber inlet/outlet 62L, which is a communication port with the outside of the dust collecting chamber 62J, upward, and a large internal space of the dust collecting chamber 62J can be secured. Furthermore, at least a part of the dust collecting chamber inlet 62L1 and at least a part of the dust collecting chamber outlet 62L2 are configured to be arranged at different positions in the left-and-right direction. In other words, the positions of one end of the dust collecting chamber inlet 62L1 and one end of the dust collecting chamber outlet 62L2 in the left-and-right direction are configured to be different from each other. By doing so, as shown in FIG. 10, it is easy to adopt configuration in which the air in the dust collecting chamber 62J flows from one side to the other side in the left-and-right direction. Therefore, it is possible to inhibit a flow of sawdust that flows in from the dust collecting chamber inlet 62L1 and moves rearward and downward due to the gravitational action, and a flow of air that moves forward and upward from the inside of the dust collecting chamber 62J to the dust collecting chamber outlet 62L2 from interfering with each other, and a smooth flow of the air AR1 can be realized. In particular, the dust collecting chamber inlet 62L1 and the dust collecting chamber outlet 62L2 have substantially the same area and shape for the balance of inflow and outflow. Therefore, by making the position of one end in the left-and-right direction different from that of the other, the center position can be made different (shifted) in the left-and-right direction, and it is possible to easily form an air flow moving in the left-and-right direction. In the present embodiment, the dust collecting chamber inlet 62L1 and the dust collecting chamber outlet 62L2 are arranged side by side in the left-and-right direction, that is, arranged adjacent to each other at positions completely shifted in the left-and-right direction, and accordingly, an optimal flow of the air AR1 and a compact dust collecting case 60 are realized. However, the dust collecting chamber inlet 62L1 and the dust collecting chamber outlet 62L2 may not have to be completely shifted in the left-and-right direction, and may be configured to be spaced apart by a constant distance in the left-and-right direction without being adjacent to each other.

Furthermore, since the dust collecting chamber inlet 62L1 and the dust collecting chamber outlet 62L2 are arranged side by side in the left-and-right direction, in a state where the housing 24 is not inclined to the right with respect to the base 22, in both the initial state and the minimum protrusion state of the circular saw 10, the dust collecting chamber inlet 62L1 and the dust collecting chamber outlet 62L2 can be arranged at the same position in the up-and-down direction. As a result, it is possible to effectively inhibit the sawdust discharged from the dust collecting chamber inlet 62L1 into the dust collecting chamber 62J from flowing back from the dust collecting chamber 62J to the dust collecting chamber outlet 62L2. In addition, by arranging the dust collecting chamber inlet 62L1 and the dust collecting chamber outlet 62L2 side by side in the left-and-right direction, it is possible to inhibit an increase in size of the dust collecting case 60 in the up-and-down direction as compared with the case of arranging these in the up-and-down direction. In addition, by arranging the dust collecting chamber inlet 62L1 and the dust collecting chamber outlet 62L2 side by side in the left-and-right direction, it is possible to inhibit an increase in size of the dust collecting case 60 in the up-and-down direction as compared with the case of arranging these at positions spaced apart in the up-and-down direction.

As described above, in the present embodiment, at least a part of the dust collecting chamber inlet 62L1 and the dust collecting chamber outlet 62L2 are arranged at the same position in the up-and-down direction, and at least a part of the dust collecting chamber inlet 62L1 and at least a part of the dust collecting chamber outlet 62L2 are made different in the left-and-right direction. Accordingly, both the capacity securing of the dust collecting chamber 62J and the smooth flow of the air AR1 are realized, but only one of these can improve the dust collection performance. These features can be realized by making the position of one end (the left end or the right end) in the left-and-right direction different, in the dust collecting chamber inlet 62L1 and the dust collecting chamber outlet 62L2. Since the inner cover 27 covers a part of the outer periphery of the saw blade 12, the width in the left-and-right direction is not large, and thus the sawdust discharge port 27H and the cover opening 27J are provided adjacent or spaced apart not in the left-and-right direction but in the front-and-rear direction. The sawdust discharge port 27H positioned at the front, the cover opening 27J, and the container-shaped dust collection chamber 62J are spatially connected to each other, and thus, it is necessary to configure the passage from the sawdust discharge port 27H and the cover opening 27J to the dust collecting chamber 62J to extend upward and rearward. Here, in a case of providing a passage upward and rearward from each of the sawdust discharge port 27H and the cover opening 27J, which are arranged at different positions in the front-and-rear direction, normally, a passage from the cover opening 27J positioned behind the sawdust discharge port 27H to the dust collecting chamber 62J is formed on the inside (the rear side and the lower side) of the passage from the sawdust discharge port 27H to the dust collecting chamber 62J, and the dust collecting chamber inlet 62L1 and the dust collecting chamber outlet 62L2 are arranged side by side in the up-and-down direction while being arranged at the same position in the left-and-right direction. However, in the present embodiment, end positions in the left-and-right direction of the dust collecting chamber inlet 62L1 and the dust collecting chamber outlet 62L2 are made different by the guide wall 62P. Accordingly, it is easy to adopt a configuration in which the capacity of the dust collecting chamber 62J is secured and a configuration in which a smooth flow of the air AR1 is realized.

Further, in the inner cover 27, the sawdust discharge port 27H is arranged on the upstream side in the rotational direction of the circular saw blade 12 with respect to the cover opening 27J. That is, the air AR1 is exhausted into the tool accommodating space 28 through the cover opening 27J on the downstream side in the rotational direction of the circular saw blade 12 with respect to the sawdust discharge port 27H. Therefore, it is possible to inhibit the discharge of sawdust from the sawdust discharge port 27H into the dust collecting case 60 from being hindered by the air AR1 exhausted into the tool accommodating space 28. Accordingly, even when the inner cover 27 is provided with the cover opening 27J for exhausting the air AR1 of the dust collecting case 60, the sawdust can be efficiently discharged from the sawdust discharge port 27H toward the dust collecting case 60.

The division wall 27F is provided at the upper end part of the tool accommodating space 28 of the inner cover 27, and the division wall 27F is arranged between the sawdust discharge port 27H and the cover opening 27J. As a result, the air AR1 exhausted into the tool accommodating space 28 through the cover opening 27J can be inhibited from flowing out toward the sawdust discharge part 27E. Therefore, in this respect as well, it is possible to inhibit the discharge of sawdust from the sawdust discharge port 27H into the dust collecting case 60 from being hindered by the air AR1 exhausted into the tool accommodating space 28. Further, the cover opening 27J is composed of a plurality of opening hole parts 27J1. Therefore, the inner cover 27 can be provided with the cover opening 27J for exhausting the air AR1 of the dust collecting case 60 while securing the coverability of the inner cover 27 with respect to the circular saw blade 12. Further, the opening area of the dust collecting chamber inlet 62L1 is set to 80% to 120% of the opening area of the dust collecting chamber outlet 62L2. As a result, the opening area of the dust collecting chamber inlet 62L1 and the opening area of the dust collecting chamber outlet 62L2 can be set to be approximately the same area. In other words, it is possible to inhibit the ratio between the opening area of the dust collecting chamber inlet 62L1 and the opening area of the dust collecting chamber outlet 62L2 from becoming excessively large. Therefore, the sawdust can be efficiently discharged into the dust collecting chamber 62J from the inflow passage 62R, and the air AR1 can be efficiently discharged from the dust collecting chamber 62J to the exhaust passage 62T.

The inflow passage 62R is provided in the dust collecting case 60, and the sawdust discharge port 27H and the dust collecting chamber inlet 62L1 are communicated with each other by the inflow passage 62R. Furthermore, the exhaust passage 62T is provided in the dust collecting case 60, and the cover opening 27J and the dust collecting chamber outlet 62L2 are communicated with each other by the exhaust passage 62T. The dust collecting chamber 62J is arranged behind the inflow passage 62R and the exhaust passage 62T (downstream side in the rotational direction of the circular saw blade 12). Therefore, the sawdust and the air AR1 discharged from the sawdust discharge port 27H to the dust collecting case 60 can be delivered well into the dust collecting chamber 62J. In addition, while effectively inhibiting the backflow of sawdust discharged into the dust collecting chamber 62J from the dust collecting chamber inlet 62L1 to the exhaust passage 62T, the air AR1 can be exhausted into the tool accommodating space 28 from the exhaust passage 62T.

The guide wall 62P is provided in the inflow passage 62R, and the guide wall 62P is inclined rightward toward the rear (toward the dust collecting chamber 62J) in a plan view. Therefore, the sawdust and the air AR1 delivered to the dust collecting chamber 62J are guided by the guide wall 62P and discharged obliquely rearward to the right from the dust collecting chamber inlet 62L1. That is, the sawdust and the air AR1 are discharged from the dust collecting chamber inlet 62L1 to move away from the dust collecting chamber outlet 62L2. Therefore, it is possible to effectively inhibit backflow of the sawdust and the air AR1 discharged from the dust collecting chamber inlet 62L1 to the dust collecting chamber outlet 62L2.

Further, as described above, the guide wall 62P is inclined to the right toward the rear side in a plan view, and thus the flow passage area of the inflow passage 62R is smaller toward the dust collecting chamber inlet 62L1. Therefore, the flow velocity of the air flow discharged from the dust collecting chamber inlet 62L1 to the dust collecting chamber 62J can be increased. Therefore, it is possible to more effectively inhibit backflow of the sawdust and the air AR1 discharged from the dust collecting chamber inlet 62L1 to the dust collecting chamber outlet 62L2.

In addition, the dust collecting chamber inlet 62L1 and the dust collecting chamber outlet 62L2 are arranged adjacent to each other on the lower side of the case top wall 62D that forms the dust collecting chamber 62J. That is, the dust collecting chamber inlet 62L1 and the dust collecting chamber outlet 62L2 are arranged at the upper end part of the dust collecting chamber 62J. As a result, it is possible to inhibit the dust collecting chamber inlet 62L1 and the dust collecting chamber outlet 62L2 from being blocked by the sawdust accumulated in the dust collecting chamber 62J.

(Regarding Dust Collection Using Dust Collecting Adapter 70)

In the dust collection using the dust collecting adapter 70, the hose of the dust collecting device is connected to the upper end part of the adapter connection part 74 in the dust collecting adapter 70. When the dust collecting device operates, the sawdust and the air in the tool accommodating space 28 are suctioned into the dust collecting device through the dust collecting adapter 70.

Specifically, as shown in FIG. 16, the sawdust and the air AR2 picked up by the circular saw blade 12 are inserted from the tool accommodating space 28 into the sawdust discharge part 27E of the inner cover 27, and discharged from the sawdust discharge part 27E into the main suction passage 70B of the dust collecting adapter 70. Then, the sawdust and the air AR2 discharged into the main suction passage 70B are discharged from the upper end part of the adapter connection part 74 to the dust collecting device. Also, in the tool accommodating space 28, the sawdust that has not been inserted into the sawdust discharge part 27E is discharged together with the air AR3 from the cover opening 27J of the inner cover 27 into the sub-suction passage 70A of the dust collecting adapter 70. The sawdust and the air AR3 discharged into the sub-suction passage 70A are discharged from the communication hole 72M of the sub-suction passage 70A to the main suction passage 70B and join the sawdust and the air AR2 in the main suction passage 70B. As a result, the sawdust and the air AR3 discharged into the main suction passage 70B are discharged from the upper end part of the adapter connection part 74 to the dust collecting device.

In this manner, in a case where the dust collecting adapter 70 is mounted on the circular saw 10, the dust collecting adapter 70 is provided with the main suction passage 70B connected to the sawdust discharge port 27H of the inner cover 27. The main suction passage 70B forms the first dust collecting passage 76 with the sawdust discharge port 27H, and the first dust collecting passage 76 allows communication between the tool accommodating space 28 and the outside of the dust collecting adapter 70. Further, the dust collecting adapter 70 is provided with the sub-suction passage 70A connected to the cover opening 27J of the inner cover 27 and the main suction passage 70B. The sub-suction passage 70A forms the second dust collecting passage 78 with the cover opening 27J, and the second dust collecting passage 78 allows communication between the tool accommodating space 28 and the main suction passage 70B. As a result, during cutting, sawdust in the tool accommodating space 28 can be suctioned into the main suction passage 70B and the sub-suction passage 70A, and discharged to the outside of the dust collecting adapter 70. That is, the sawdust that has not been inserted into the sawdust discharge part 27E of the inner cover 27 can be suctioned into the sub-suction passage 70A through the cover opening 27J and discharged to the outside of the dust collecting adapter 70.

Here, the minimum flow passage area of the second dust collecting passage 78 is set to be equal to or less than the minimum flow passage area of the first dust collecting passage 76. Specifically, the area of the communication hole 72M of the sub-suction passage 70A is set to be equal to or less than the area of the sawdust discharge port 27H of the inner cover 27. As a result, while inhibiting a decrease in the suction force of the first dust collecting passage 76 into which the sawdust picked up from the front end part of the circular saw blade 12 is mainly inserted, the sawdust can be discharged from the first dust collecting passage 76 to the outside of the dust collecting adapter 70. Also, the sawdust that is not inserted into the main suction passage 70B and flows downstream in the rotational direction of the circular saw blade 12 can be suctioned by the second dust collecting passage 78 and discharged to the main suction passage 70B of the first dust collecting passage 76. Therefore, it is possible to provide an optimal dust collection structure while increasing the dust collection efficiency for sawdust.

The division wall 27F is provided at the upper end part of the tool accommodating space 28 of the inner cover 27, and the division wall 27F is arranged between the sawdust discharge port 27H and the cover opening 27J. Therefore, the sawdust picked up by the circular saw blade 12 can be guided toward the sawdust discharge port 27H by the division wall 27F. Therefore, the sawdust picked up by the circular saw blade 12 can be mainly guided to the first dust collecting passage 76 with high dust collection efficiency.

The cover opening 27J of the inner cover 27 is composed of the plurality of opening hole parts 27J1, and the opening hole parts 27J1 are arranged side by side in the front-and-rear direction. As a result, while inhibiting the opening area of the cover opening 27J from becoming larger than the opening area of the sawdust discharge port 27H, the cover opening 27J can be arranged in a relatively wide range in the front-and-rear direction. Therefore, the sawdust that has not been inserted into the sawdust discharge port 27H can be suctioned over a relatively wide range in the rotational direction of the circular saw blade 12 on the downstream side in the rotational direction of the circular saw blade 12 with respect to the sawdust discharge port 27H.

Further, in the circular saw 10, the dust collecting case 60 and the dust collecting adapter 70 are configured to be attachable to and detachable from the inner cover 27, and one of the dust collecting case 60 and the dust collecting adapter 70 is mounted on the inner cover 27 according to the dust collection mode for sawdust. When mounting the dust collecting case 60 on the inner cover 27, as described above, the sawdust is discharged from the sawdust discharge part 27E of the inner cover 27 toward the dust collecting case 60, and the air AR1 from the dust collecting case 60 is exhausted into the tool accommodating space 28 through the cover opening 27J of the inner cover 27. On the other hand, when mounting the dust collecting adapter 70 on the inner cover 27, as described above, the sawdust is discharged from the sawdust discharge part 27E and the cover opening 27J of the inner cover 27 toward the dust collecting adapter 70. That is, depending on the dust collecting case 60 and the dust collecting adapter 70 to be mounted, the cover opening 27J is functions as a discharge part for discharging the sawdust to the outside of the tool accommodating space 28 or an exhaust part for exhausting the air into the tool accommodating space 28. As a result, different dust collectors (the dust collecting case 60 and the dust collecting adapter 70) can be attached to the inner cover 27, and can correspond to different types of dust collection methods. Therefore, it is possible to have an optimal dust collection structure.

Further, the dust collecting adapter 70 is provided with the cover part 72S, and the cover part 72S partially blocks a part of the cover opening 27J of the inner cover 27. Therefore, the opening area of the cover opening 27J when the dust collecting adapter 70 is mounted on the inner cover 27 can be made smaller than when the dust collecting case 60 is mounted on the inner cover 27. Accordingly, in the inner cover 27 on which different types of dust collectors are mounted, the opening area of the cover opening 27J can be changed corresponding to different types of dust collection methods. In other words, the opening area of the cover opening 27J when functioning as the discharge part can be set smaller than the opening area of the cover opening 27J when functioning as the exhaust part. As a result, it is possible to inhibit a decrease in the suction force of the main suction passage 70B in the dust collecting adapter 70 and collect the sawdust.

Moreover, the cover part 72S blocks the opening hole part 27J1 arranged on the frontmost side of the cover opening 27J. Therefore, the sawdust that has not been inserted into the sawdust discharge part 27E of the inner cover 27 can be suctioned well into the sub-suction passage 70A of the dust collecting adapter 70 through the cover opening 27J. That is, in the inner cover 27, since the division wall 27F is arranged between the sawdust discharge port 27H and the cover opening 27J, the sawdust that has not been inserted into the sawdust discharge part 27E flows downstream in the rotational direction of the circular saw blade 12 exceeding the lower side of the division wall 27F. Therefore, it is difficult for the sawdust that flows downstream exceeding the lower side of the division wall 27F to enter the opening hole part 27J1 arranged on the frontmost side of the cover opening 27J. As a result, compared to the configuration in which the rear opening hole part 27J1 is blocked by the cover part 72S, the sawdust that has not been completely inserted into the sawdust discharge part 27E can be delivered well from the cover opening 27J into the sub-suction passage 70A.

In the present embodiment, in both the initial state and the minimum protrusion state of the circular saw 10, the entire dust collecting chamber inlet 62L1 and the dust collecting chamber outlet 62L2 of the dust collecting case 60 are arranged at overlapping positions in the up-and-down direction. However, a part of the dust collecting chamber inlet 62L1 and a part of the dust collecting chamber outlet 62L2 may be arranged at overlapping positions in the up-and-down direction.

Further, in the present embodiment, the dust collecting chamber inlet 62L1 and the dust collecting chamber outlet 62L2 of the dust collecting case 60 are arranged side by side in the left-and-right direction. That is, the front-and-back positions of the dust collecting chamber inlet 62L1 and the dust collecting chamber outlet 62L2 match each other. Alternatively, the front-and-rear positions of the dust collecting chamber inlet 62L1 and the dust collecting chamber outlet 62L2 may be shifted.

In addition, in the present embodiment, in both the initial state and the minimum protrusion state of the circular saw 10, the entire dust collecting chamber inlet 62L1 and the dust collecting chamber outlet 62L2 of the dust collecting case 60 are arranged at overlapping positions in the up-and-down direction. However, at least in the initial state, the dust collecting chamber inlet 62L1 and the dust collecting chamber outlet 62L2 may be arranged at overlapping positions in the up-and-down direction.

In addition, in the present embodiment, the dust collecting chamber inlet 62L1 and the dust collecting chamber outlet 62L2 are formed at the upper end part of the case partition wall 62H. However, the up-and-down positions of at least a part of the dust collecting chamber inlet 62L1 and at least a part of the dust collecting chamber outlet 62L2 can be changed in any manner as long as the positions overlap each other in the up-and-down direction. For example, the dust collecting chamber inlet 62L1 and the dust collecting chamber outlet 62L2 may be arranged at the middle part in the up-and-down direction of the case partition wall 62H.

Further, in the present embodiment, the plurality of opening hole parts 27J1 of the cover opening 27J of the inner cover 27 is formed in an elongated shape of which the left-and-right direction is the longitudinal direction, and arranged side by side in the front-and-rear direction. Alternatively, the opening hole parts 27J1 may be formed in a long hole shape of which the front-and-rear direction is the longitudinal direction and arranged in the left-and-right direction.

The invention claimed is:
1. A work machine, comprising:
a base formed in a plate shape;
a circular saw rotated around a shaft along a left-right direction by a motor and partially protrudes below the base;
a housing supported by the base on an upper side of the base and accommodating the motor;
a cover covering at least a part of the circular saw; and a dust collecting structure comprising a dust collecting chamber capable of collecting work chips produced by driving the circular saw, wherein the dust collecting structure is provided with:
- an inlet serving as an entrance of the dust collecting chamber,
- an inflow part connected with the inlet and serving as a passage of the work chips,
- an outlet serving as an exit of the dust collecting chamber,
- an outflow part connected with the outlet and serving as a passage for delivering air in the dust collecting chamber to an inner side of the cover, and
- a partition wall, wherein the cover is provided with a first opening for discharging the work chips from an inside of the cover towards the inlet and a second opening for introducing air from the outlet into the cover, and the inflow part extending from the inlet towards the first opening and the outflow part extending from the outlet towards the second opening are at least partially partitioned in the left-right direction by the partition wall, and a part of the partition wall is disposed adjacent to the cover and between the first opening and the second opening, and at least a part of the inlet and at least a part of the outlet are arranged at the same position in an up-down direction.

2. The work machine according to claim 1, wherein
the base is formed with a through-hole for making a part of the circular saw protrude downwards,
the housing is connected to an adjustment mechanism capable of adjusting a protrusion amount of the circular saw from the through-hole, and
at least a part of the inlet and at least a part of the outlet are arranged at the same position in the up-down direction at least when the protrusion amount of the circular saw is the maximum.

3. The work machine according to claim 1, wherein
the dust collecting structure comprises a cover member that covers the circular saw and that is provided in the housing, and
the cover member covers the circular saw from an upper side.

4. The work machine according to claim 3, wherein
the inlet and the outlet are arranged side by side in a plate thickness direction of the circular saw.

5. The work machine according to claim 3, wherein
the first opening is arranged upstream of the second opening in a rotational direction of the circular saw.

6. The work machine according to claim 3, wherein
an area of the inlet is 80% to 120% of an area of the outlet.

7. The work machine according to claim 6, wherein
the dust collecting chamber is provided with the partition wall that partitions the inflow part and the outflow part.

8. The work machine according to claim 7, wherein
the dust collecting chamber is provided with a guide part that partitions the inflow part and the outflow part in a direction different from the partition wall.

9. The work machine according to claim 8, wherein
the work chips or air discharged from the inlet to the dust collecting chamber is guided by the guide part in a direction away from the outlet.

10. The work machine according to claim 3, wherein
the dust collecting structure comprises a dust collecting case configured to be detachable from the housing, and the inlet and the outlet are provided on the dust collecting case.

11. The work machine according to claim 10, wherein
the inflow part connects the inlet and the first opening, and
the outflow part connects the outlet and the second opening, and
the dust collecting case has an outflow part and the inflow part.

12. A work machine that performs processing work in a forward direction by a circular saw rotated around a shaft along a left-right direction by a motor, the work machine having:
- a cover covers at least a part of the circular saw; and
- a dust collection structure that collects dust produced by the processing work, in which the dust collection structure includes:
  - a dust collecting chamber for storing the dust,
  - a transfer part having an inflow part that delivers the dust to the dust collecting chamber and an outflow part that discharges air in the dust collecting chamber to an inside of the cover,
  - a partition wall having a first partition part connected to a bottom of the dust collecting chamber and extending upward to partition the dust collecting chamber and the transfer part and partially partitions the inflow part and the outflow part in the left-right direction, and
  - a communication part positioned above an upper end of the first partition part and communicating between the dust collecting chamber and the transfer part, wherein the cover is provided with a first opening for discharging the dust from an inside of the cover towards the inflow part and a second opening for introducing air from the outflow part into the cover, a part of the partition wall is disposed adjacent to the cover and between the first opening and the second opening, and the communication part is provided with an inlet connected to the inflow part and an outlet connected to the outflow part, and is configured such that positions of one end of the inlet and one end of the outlet in the left-right direction are different from each other.

13. The work machine according to claim 12, wherein
at least a part of the inlet and at least a part of the outlet are configured to be arranged at different positions in the left-and-right direction or at the same position in an up-and-down direction.

14. The work machine according to claim 12, wherein
the transfer part is provided with a second partition part that partitions the inflow part and the outflow part in a front-and-rear direction, and a third partition part that partitions the inflow part and the outflow part in the left-and-right direction.

15. A work machine, comprising:
a base formed in a plate shape;
a housing supported by the base on an upper side of the base and accommodating a motor for driving a circular saw; and
the circular saw rotated around a shaft along a left-right direction by the motor and partially protrudes downwards from the base;
a cover covers at least a part of the circular saw; and
a dust collecting structure comprising a dust collecting chamber capable of collecting work chips produced by driving the circular saw, wherein the dust collecting structure is provided with:
- an inlet serving as an entrance of the dust collecting chamber,
- an inflow part connected with the inlet and serving as a passage of the work chips,
- an outlet serving as an exit of the dust collecting chamber,
- an outflow part connected with the outlet and serving as a passage for delivering air in the dust collecting chamber to an inner side of the cover, and
- a partition wall, wherein the cover is provided with a first opening for discharging the work chips from the inner side of the cover towards the inlet and a second opening for introducing air from the outlet into the cover, the partition wall has a first partition part extending in an up-down direction, a second partition part connected to the first partition part, and a third partition part connected to the second partition part, wherein the first partition part at least partially partitions both the inflow part and the outflow part from the dust collection chamber in a front-to-rear direction, the second partition part partitions the inflow part and the outflow part at least partially in the front-to-rear direction, and the third partition part partitions the inflow part and the outflow part at least partially in the left-to-right direction, the inlet and the outlet are provided on an upper side of the dust collecting chamber, and at least a part of the inlet and at least a part of the outlet are arranged at the same position in the up-down direction.

* * * * *